United States Patent
Endoh

(10) Patent No.: US 8,266,445 B2
(45) Date of Patent: Sep. 11, 2012

(54) ENCRYPTED COMMUNICATION SYSTEM, ENCRYPTED COMMUNICATION METHOD, ENCRYPTING DEVICE, AND DECRYPTING DEVICE

(75) Inventor: Tsuneo Endoh, Tokyo (JP)

(73) Assignee: NEC Corporation, Tokyo (JP)

( * ) Notice: Subject to any disclaimer, the term of this patent is extended or adjusted under 35 U.S.C. 154(b) by 1045 days.

(21) Appl. No.: 12/055,472

(22) Filed: Mar. 26, 2008

(65) Prior Publication Data

US 2008/0310626 A1 Dec. 18, 2008

(30) Foreign Application Priority Data

Mar. 28, 2007 (JP) ................................. 2007-083871

(51) Int. Cl.
*G06F 21/00* (2006.01)

(52) U.S. Cl. ........................................ 713/189; 713/167

(58) Field of Classification Search ........................ None
See application file for complete search history.

(56) References Cited

U.S. PATENT DOCUMENTS

| | | | |
|---|---|---|---|
| 6,598,161 B1 * | 7/2003 | Kluttz et al. | 713/166 |
| 7,010,681 B1 * | 3/2006 | Fletcher et al. | 713/154 |
| 2007/0055892 A1 * | 3/2007 | Pikus | 713/189 |

FOREIGN PATENT DOCUMENTS

| | | |
|---|---|---|
| JP | 05244150 A | 9/1993 |
| JP | 1995225550 A | 8/1995 |
| JP | 09233067 A | 9/1997 |
| JP | 2002157223 A | 5/2002 |
| JP | 2002259634 A | 9/2002 |
| JP | 2004151163 A | 5/2004 |
| JP | 2006092525 A | 4/2006 |

OTHER PUBLICATIONS

Japanese Office Action dated Feb. 24, 2009 for Patent Application No. 2007-083871.

* cited by examiner

*Primary Examiner* — Philip Chea
*Assistant Examiner* — Carlton Johnson

(57) ABSTRACT

To allow viewers to view a plain document depending on levels of the authorized powers of the viewers without inserting identifiers into the plain document. An encrypting device includes devices for: storing encrypting role information which includes encrypting keys and key IDs of the encrypting keys; grasping the encrypting range of the plain document, and creating an encrypted part by encrypting the encrypting range using the encrypting key in the encrypting role information; creating the encrypting information configured with one, two, or more record(s) containing the front position and rear position of the encrypted part, the key ID corresponding to the encrypting key that is applied for the encrypted part, and the processing order of the encrypted part; creating the encrypted document by combining an encrypted document main body configured with a document containing the encrypted part with the encrypting information; and storing the encrypted document to a prescribed medium.

12 Claims, 19 Drawing Sheets

FIG. 2

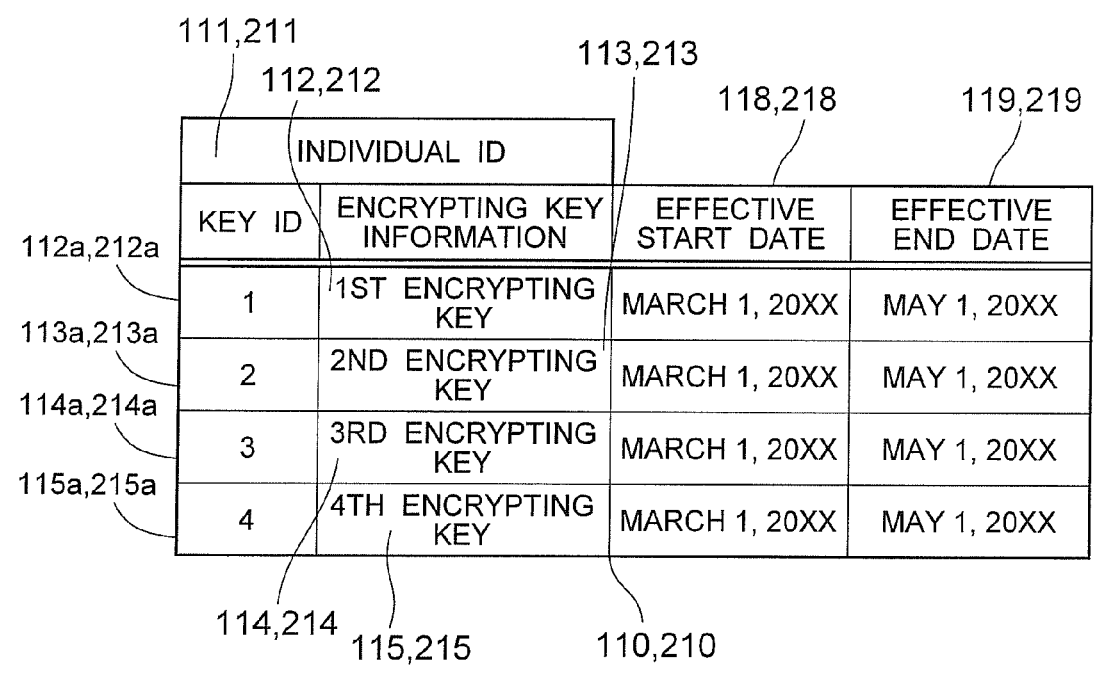

| KEY ID | ENCRYPTING KEY INFORMATION | EFFECTIVE START DATE | EFFECTIVE END DATE |
|---|---|---|---|
| | INDIVIDUAL ID | | |
| 1 | 1ST ENCRYPTING KEY | MARCH 1, 20XX | MAY 1, 20XX |
| 2 | 2ND ENCRYPTING KEY | MARCH 1, 20XX | MAY 1, 20XX |
| 3 | 3RD ENCRYPTING KEY | MARCH 1, 20XX | MAY 1, 20XX |
| 4 | 4TH ENCRYPTING KEY | MARCH 1, 20XX | MAY 1, 20XX |

FIG. 4

| VERSION NUMBER | | | |
|---|---|---|---|
| PROCESSING ORDER | ENCRYPTING RANGE (FRONT_END POSITION – REAR_END POSITION) | ENCRYPTED PART (FRONT_END POSITION – REAR_END POSITION) | KEY ID |
| 1 | 2–3 | L2–L4 | 1 |
| 2 | 7–8 | L8–L9 | 1 |
| 3 | 6–8 | L7–L13 | 2 |

FIG. 8A

| ORDER | ENCRYPTING RANGE | ENCRYPTED PART | KEY ID |
|---|---|---|---|
| 1 | 2–3 | L2–L3 | 1 |

FIG. 8B

| ORDER | ENCRYPTING RANGE | ENCRYPTED PART | KEY ID |
|---|---|---|---|
| 1 | 2–3 | L2–L3 | 1 |
| 2 | 6–9 | L6–L9 | 2 |

FIG. 8C

| ORDER | ENCRYPTING RANGE | ENCRYPTED PART | KEY ID |
|---|---|---|---|
| 1 | 2–3 | L2–L3 | 1 |
| 2 | 6–9 | L6–L9 | 2 |
| 3 | 7–8 | L7–L8 | 1 |

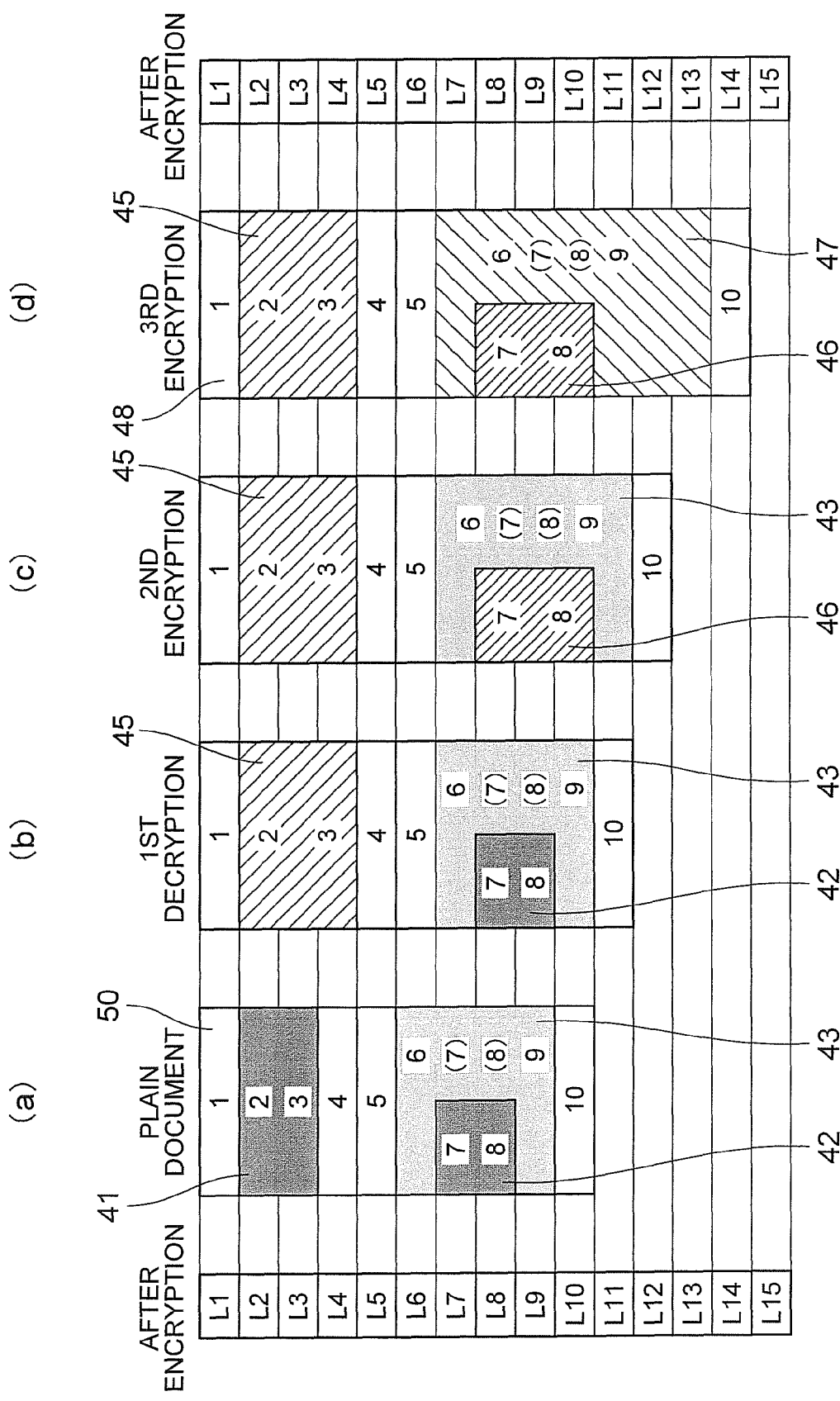

FIG.10A

DESIGNATION OF ENCRYPTING RANGE

| ORDER | ENCRYPTING RANGE | FRONT END POSITION REAR END POSITION | KEY ID |
|---|---|---|---|
| 1 | 2−3 | L2−L3 | 1 |
| 2 | 7−8 | L7−L8 | 1 |
| 3 | 6−9 | L6−L9 | 2 |

FIG.10B

1ST ENCRYPTION

| ORDER | ENCRYPTING RANGE | FRONT END POSITION REAR END POSITION | KEY ID |
|---|---|---|---|
| 1 | 2−3 | L2−L4 | 1 |
| 2 | 7−8 | L8−L9 | 1 |
| 3 | 6−9 | L7−L10 | 2 |

FIG.10C

2ND ENCRYPTION

| ORDER | ENCRYPTING RANGE | FRONT END POSITION REAR END POSITION | KEY ID |
|---|---|---|---|
| 1 | 2−3 | L2−L4 | 1 |
| 2 | 7−8 | L8−L10 | 1 |
| 3 | 6−9 | L7−L11 | 2 |

FIG.10D

3RD ENCRYPTION

| ORDER | ENCRYPTING RANGE | FRONT END POSITION REAR END POSITION | KEY ID |
|---|---|---|---|
| 1 | 2−3 | L2−L4 | 1 |
| 2 | 7−8 | L8−L10 | 1 |
| 3 | 6−9 | L7−L13 | 2 |

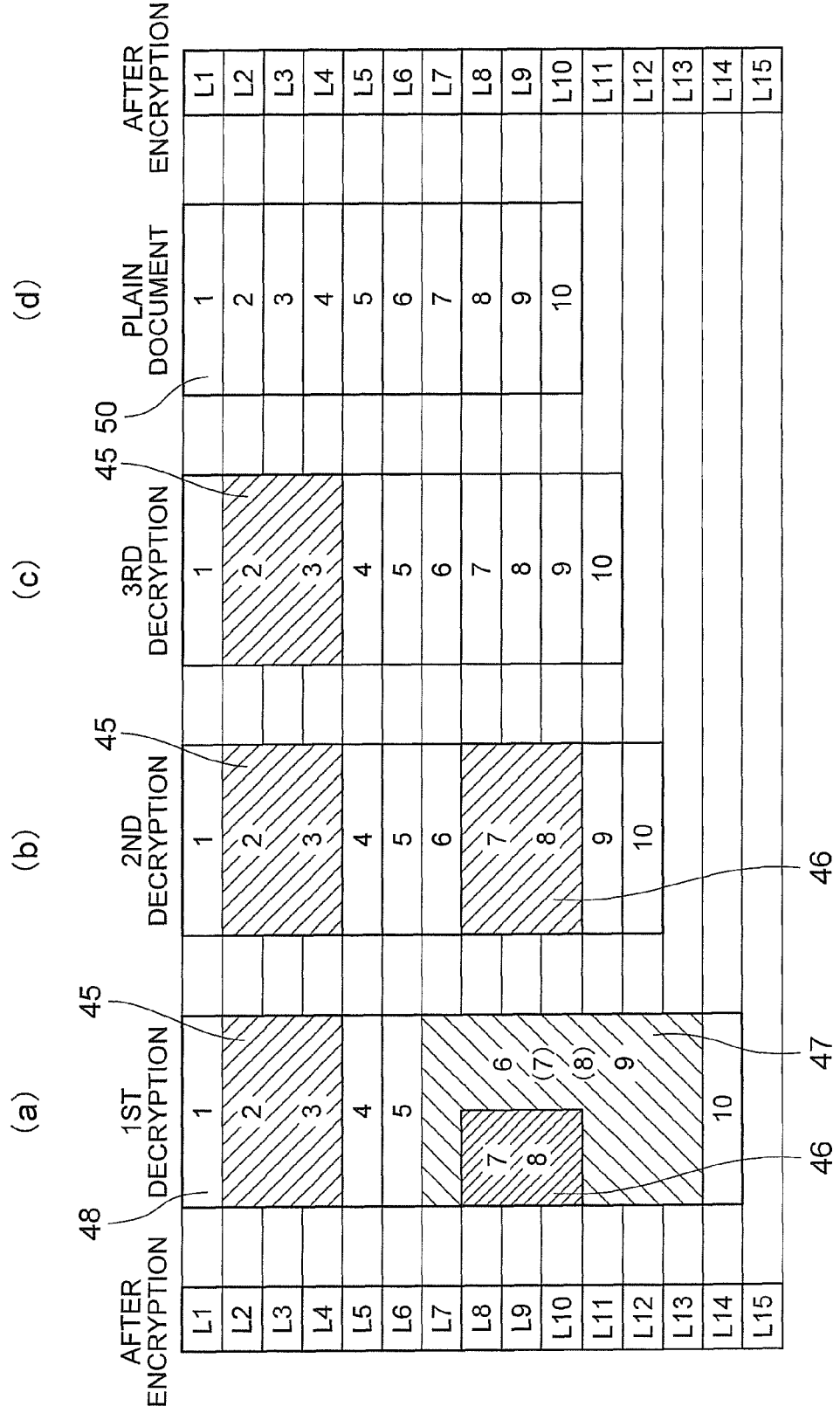

FIG.13A

DECRYPTION ORDER →

| ORDER | ENCRYPTING RANGE | ENCRYPTED PART | KEY ID |
|---|---|---|---|
| 1 | 2-3 | L2-L4 | 1 |
| 2 | 7-8 | L8-L10 | 1 |
| 3 | 6-9 | L7-L13 | 2 |

1ST DECRYPTION

FIG.13B

| ORDER | ENCRYPTING RANGE | ENCRYPTED PART | KEY ID |
|---|---|---|---|
| 1 | 2-3 | L2-L4 | 1 |
| 2 | 7-8 | L8-L10 | 1 |

2ND DECRYPTION

FIG.13C

| ORDER | ENCRYPTING RANGE | ENCRYPTED PART | KEY ID |
|---|---|---|---|
| 1 | 2-3 | L2-L4 | 1 |

3RD DECRYPTION

FIG.14

| INDIVIDUAL ID | | | |
|---|---|---|---|
| KEY ID | ENCRYPTING KEY INFORMATION | EFFECTIVE START DATE | EFFECTIVE END DATE |
| 2 | 2ND ENCRYPTING KEY | MARCH 1, 20XX | MAY 1, 20XX |

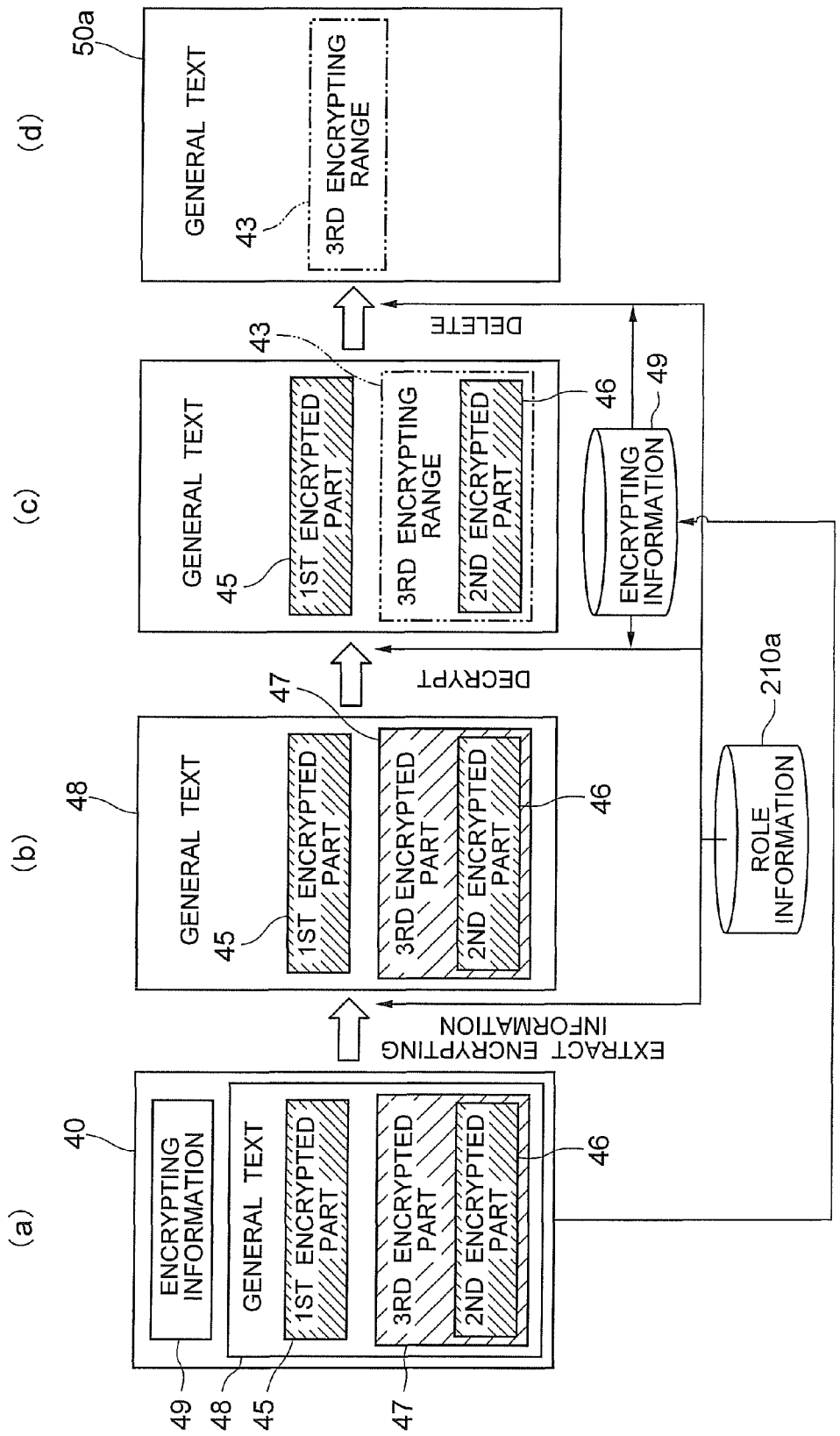

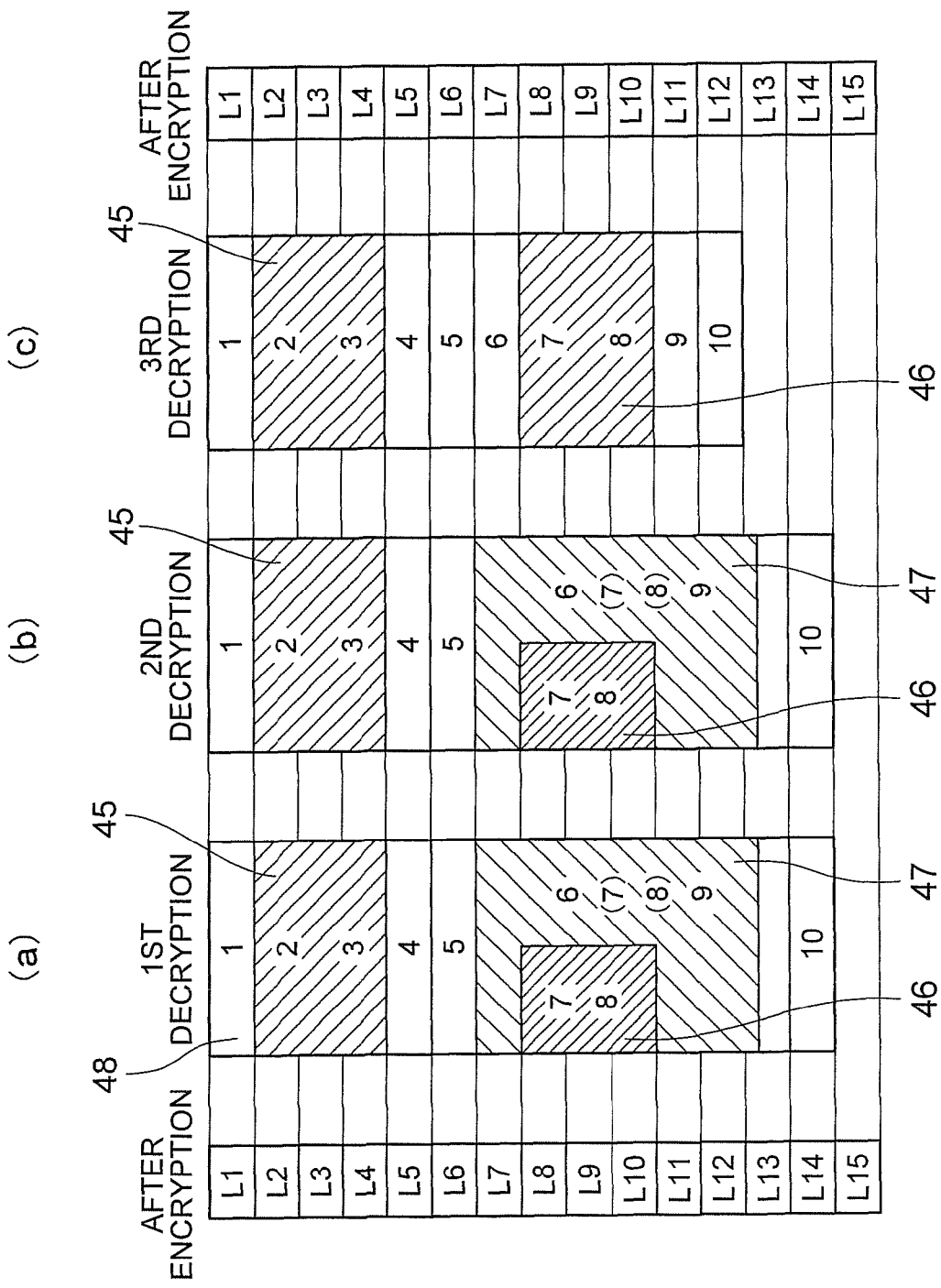

FIG.17A

1ST DECRYPTION

| DECRYPTION ORDER | ENCRYPTING RANGE | ENCRYPTED PART | KEY ID |
|---|---|---|---|
| 1 | 7–8 | L7–L9 | 1 |
| 2 | 6–9 | L6–L12 | 2 |
| 3 | 2–3 | L2–L4 | 1 |

FIG.17B

2ND DECRYPTION

| ORDER | ENCRYPTING RANGE | ENCRYPTED PART | KEY ID |
|---|---|---|---|
| 1 | 7–8 | L8–L10 | 1 |
| 2 | 6–9 | L7–L13 | 2 |
| 3 | 2–3 | L2–L4 | 1 |

FIG.17C

3RD DECRYPTION

| ORDER | ENCRYPTING RANGE | ENCRYPTED PART | KEY ID |
|---|---|---|---|
| 1 | 7–8 | L8–L10 | 1 |
| 2 | 2–3 | L2–L4 | 1 |

FIG.19A

| ORDER | ENCRYPTING RANGE | ENCRYPTED PART | KEY ID |
|---|---|---|---|
| 1 | 7–8 | L8–L10 | 1 |
| 2 | 2–3 | L2–L4 | 1 |

1ST DELETION

DELETION ORDER ←

FIG.19B

| ORDER | ENCRYPTING RANGE | ENCRYPTED PART | KEY ID |
|---|---|---|---|
| 1 | 7–8 | L5–L7 | 1 |

2ND DELETION

ENCRYPTED COMMUNICATION SYSTEM, ENCRYPTED COMMUNICATION METHOD, ENCRYPTING DEVICE, AND DECRYPTING DEVICE

CROSS-REFERENCE TO RELATED APPLICATION

This application is based upon and claims the benefit of priority from Japanese patent application No. 2007-083871, filed on Mar. 28, 2007, the disclosure of which is incorporated herein in its entirety by reference.

BACKGROUND OF THE INVENTION

1. Field of the Invention

The present invention relates to an encrypted communication system with which a created plain document is encrypted before being transmitted to a viewer and the encrypted document is decrypted and the plain document is received on a viewer side, as well as to an encrypted communication method of the encryption system, an encrypting device used in the encrypted communication system, and a decrypting device used in the encrypted communication system.

2. Description of the Related Art

In general, plain documents created in organizations such as companies include various kinds of information, e.g. contents that can be opened to the public (outside the company), contents that are not disclosed to the outside the company, such as employee and customer information, contents such as management information that is disclosed only to those who are in the executive positions in that company organization. Particularly, information that is important in that company and considered as highly confidential is considered as necessary to be encrypted from the security view point, and it is common to encrypt the entire plain document (the entire part of a file) to keep the security.

However, a single plain document may include the content which can be read freely and the content which is preferred not to be read, in accordance with levels of the authorized powers of members (executives, ordinary employees, external workers, etc.) even those are members of a same organization. In that case, even if the document is encrypted for the security reason, it can be read by all the viewers when the encrypted file is decrypted.

Further, when an exclusive document is created for each viewer, it is necessary to correct all of each document for making a correction in a part that is common to the plain documents of all the viewers. This work is complicated and may cause errors in correction. If the documents are distributed with such miscorrection, wrong information is dispersed. Therefore, it takes a lot of cost as well as time and effort to clear the problem.

As encrypted communication system techniques which restrict viewing of a specific range within an article in accordance with levels of the authorized powers of the viewers, there are techniques depicted in Patent Documents 1-3, for example.

The encrypted communication system depicted in Japanese Unexamined Patent Publication 2002-259634 (paragraphs [0051]-[0059]: Patent Document 1) includes an information distributing device that belongs to a slip issuer and information distributing devices that belong to each of a plurality of viewers. With the technique of Patent Document 1, first, the information distributing device of the slip issuer creates viewable range identifiers for identifying viewable ranges for permitting the viewing of the slip for each viewer, and decrypting information which shows a list of pairs of identifiers and common keys for encrypting the viewable ranges. This decrypting information is encrypted by using a public key of each viewer and it is transmitted to each viewer. The information distributing devices of the viewers decrypt the received decrypting information by using own private keys, respectively, to obtain the common key for decrypting the viewable range that is permitted to itself.

Then, the information distributing device of the slip issuer encrypts the respective part in the slip designated by the viewable range identifiers by using the corresponding common keys, and transmits those to the respective viewers. The information distributing devices of the viewers respectively decrypt the received viewable range (permitted to view) of the slip by using the common key from the decrypting information that is obtained earlier. In this manner, the creator of the slip sets different decrypting information for each user for allowing each user to view only the specific part of the slip that is defined by the respective viewable range identifiers.

With the encrypted communication system depicted in Japanese Unexamined Patent Publication H05-244150 (FIG. 3, FIG. 4, and the like) (Patent Documents 2) and Japanese Unexamined Patent Publication H09-233067 (FIG. 3, FIG. 4, and the like) (Patent Documents 3), viewable range identifiers that vary depending on the levels of the authorized powers of the viewers are written in advance in the slip that is used for communication. The creator of the slip creates an encrypted document by encrypting the part that is sandwiched by the identifiers by using an encrypting key that corresponds to the level of the authorized power of a prescribed viewer, and transmits the encrypted document to that viewer. Then, the viewer decrypts the encrypted part by using the encrypting key that corresponds to the level of the authorized power of the viewer oneself. In this manner, the creator of the plain document restricts the viewable range depending on the viewers.

However, with those communication systems described above, the identifiers are inserted into the plain documents to be transmitted to the viewers for designating the range that is encrypted by using the identifiers, which makes it complicated for the creators to create the encrypted documents. Further, when the identifiers are inserted into the plain documents, the creator and the viewers who decrypt the encrypted documents are to read the plain documents having the identifiers included therein, which may make it difficult for them to understand the contents of the plain documents.

SUMMARY OF THE INVENTION

An exemplary object of the present invention therefore is to provide an encrypted communication system which can permit viewers to view a plain document depending on the levels of the authorized powers of the viewers without inserting identifiers into the plain document, and to provide a communication method of the communication system, an encrypting device and a decrypting device used in the communication system.

In order to achieve the foregoing exemplary object, an encrypted communication system according to an exemplary aspect of the present invention is an encrypted communication system which includes an encrypting device for creating an encrypted document from a plain document and a decrypting device for decrypting the encrypted document to obtain the plain document, wherein the encrypting device creates the encrypted document by encrypting information of a front end position and a rear end position indicating an encrypting range of the plain document and encrypting the encrypting range that is specified in the plain document by the front end position and the rear end position, and transmits the encrypted document to the decrypting device; and the decrypting device decrypts the encrypted information of the front end position and the rear end position, and decrypts the encrypting range that is specified in the plain document by the decrypted front end position and the rear end position.

An encrypted communication method according to another exemplary aspect of the present invention is an encrypted communication method which creates an encrypted document from a plain document and extracts the plain document by decrypting the encrypted document, the method includes: creating the encrypted document by encrypting information of a front end position and a rear end position indicating an encrypting range of the plain document and encrypting the encrypting range that is specified in the plain document by the front end position and the rear end position, and transmitting the encrypted document to the decrypting device; and decrypting the encrypted information of the front end position and the rear end position, and decrypting the encrypting range that is specified in the plain document by the decrypted front end position and the rear end position.

As an exemplary advantage according to the invention, the front end positions and the rear end positions of the encrypted parts are contained in the encrypting information by the encrypting information creating device of the encrypting device. Thus, the encrypting parts can be specified based on the front end positions and the rear end positions thereof. With this, the encrypting device side can encrypt a specific part of the plain document without inserting identifiers into the plain document, so that an encrypted document can be created easily.

BRIEF DESCRIPTION OF THE DRAWINGS

FIG. 2 is an illustration showing encrypting role information and decrypting role information used in the encrypted communication system according to the exemplary embodiment of the invention;

FIG. 4 is an illustration showing encrypting information used in the encrypted communication system according to the exemplary embodiment of the invention;

FIGS. 8A-8C are illustrations showing a process for creating encrypting information by an encrypting information creating device of the encrypting device of the encrypted communication system according to the exemplary embodiment of the invention;

FIG. 9(a)-9(d) is an illustration showing a process for performing encryption processing on each encrypting range by an encryption processing device of the encrypting device of the encrypted communication system according to the exemplary embodiment of the invention;

FIGS. 10A-10D are illustrations showing a process for correcting the encrypting information in the process of the encryption processing performed by the encryption processing device of the encrypting device of the encrypted communication system according to the exemplary embodiment of the invention;

FIG. 12(a)-12(d) is an illustration showing a process for performing decryption processing on each encrypted part by a decryption processing device of the decrypting device of the encrypted communication system according to the exemplary embodiment of the invention;

FIGS. 13A-13C are illustrations showing the encrypting information in the process of the decryption processing performed by the decryption processing device of the decrypting device of the encrypted communication system according to the exemplary embodiment of the invention;

FIG. 14 is an illustration showing another decrypting role information for a viewer used by the decrypting device of the encrypted communication system according to the exemplary embodiment of the invention;

FIG. 15(a)-15(d) is an illustration showing a process for performing decryption processing on each encrypted part by the decryption processing device of the decrypting device of the encrypted communication system according to the exemplary embodiment of the invention;

FIG. 16(a)-16(c) is an illustration showing a process for performing decryption processing on each encrypted part by the decryption processing device of the decrypting device of the encrypted communication system according to the exemplary embodiment of the invention;

FIGS. 17A-17C are illustrations showing the encrypting information in the process of the decryption processing performed by the decryption processing device of the decrypting device of the encrypted communication system according to the exemplary embodiment of the invention;

FIGS. 19A and 19B are illustrations showing the encrypting information in the process for deleting the decrypted part performed by the deleting device of the decrypting device of the encrypted communication system according to the exemplary embodiment of the invention.

DETAILED DESCRIPTION OF THE EXEMPLARY EMBODIMENTS

Hereinafter, an encrypted communication system, a communication method of the encrypted communication system, and an encrypting device as well as a decrypting device used in the encrypted communication system according to an exemplary embodiment of the present invention will be described in detail.

Figure 1:
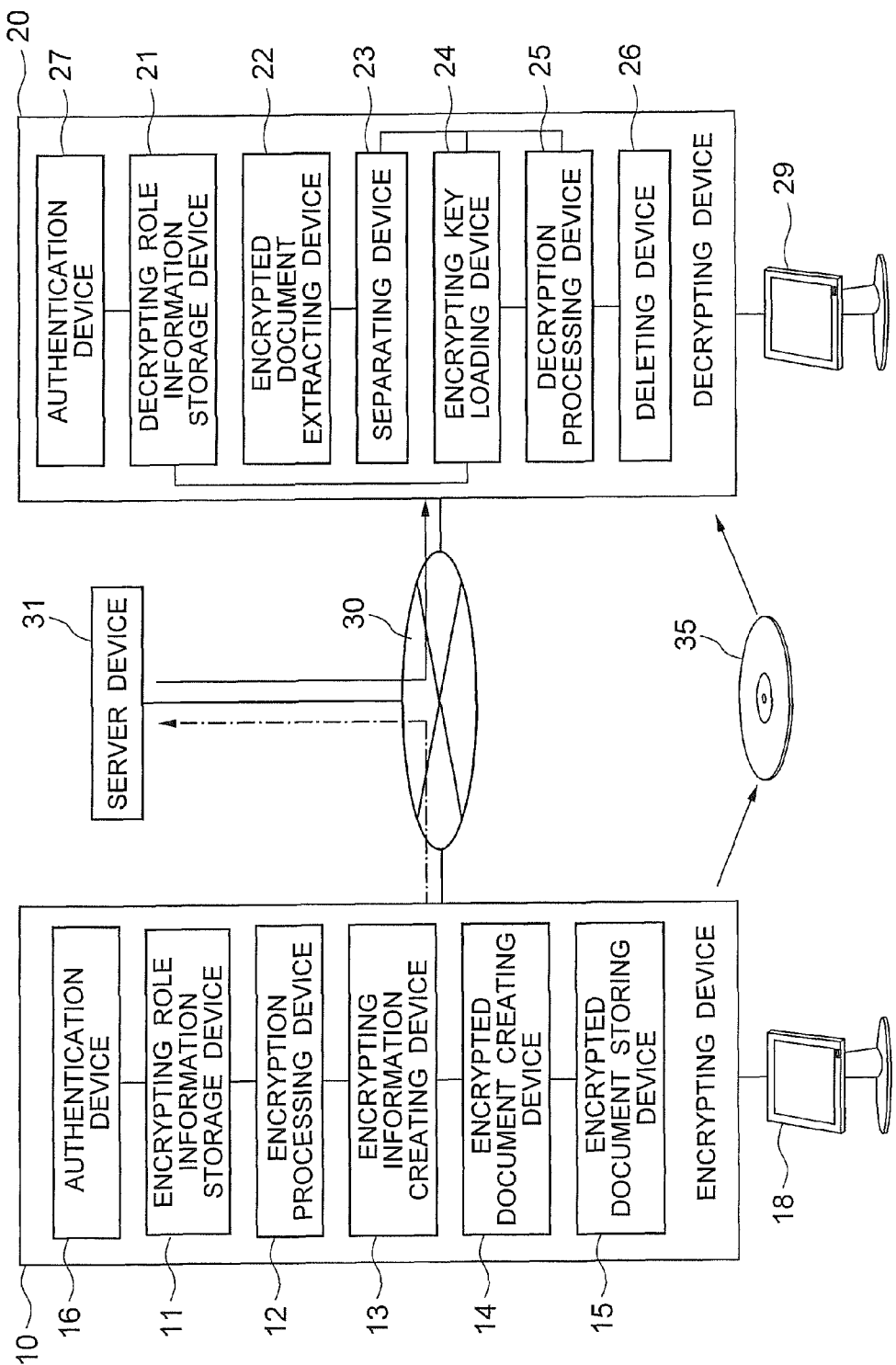
FIG. 1 is a schematic diagram showing an encrypted communication system according to an exemplary embodiment of the invention.

As shown in FIG. 1, the encrypted communication system according to the exemplary embodiment of the invention includes, as the basic structure, an encrypting device 10 for creating an encrypted document from a plain document, and a decrypting device 20 for decrypting the encrypted document to extract the plain document. Each of the encrypting device 10 and the decrypting device 20 are configured with a general-purpose calculator, and is provided with a storage part including an HDD or the like and an arithmetic processing part including a CPU or the like.

The encrypting device 10 includes: an encrypting role information storage device 11 for storing encrypting role information that is configured with a plurality of encrypting keys 112-115 that correspond to the authorized powers of the viewers and key IDs for identifying the encrypting keys 112-115; an encryption processing device 12 which grasps an encrypting range that is a part of or an entire part of the plain document, and creates an encrypting part through encrypting the encrypting range by using the encrypting key stored in the encrypting role information storage device 11; an encrypting information creating device 13 for creating the encrypting information that is configured with a single, two, or more record(s) containing the front end position, rear end position of the encrypted part created by the encryption processing device 12, the key ID corresponding to the encrypting key that is used for the encrypted part, and the order of the processing performed by the encryption processing device 12; an encrypted document creating device 14 for creating an encrypted document by combining an encrypted document main body including the encrypted part and encrypting information 49; and an encrypted document storing device 15 for storing the encrypted document created by the encrypted document creating device to a prescribed medium.

As shown in FIG. 2, encrypting role information 110 stored in the encrypting role information storage device 111 is distributed to the respective creators. The encrypting roll information 110 is configured with a role information table that includes an individual ID 111 of the creator, the encrypting keys 112-115, the key IDs 112a-115a, and effective start date 118 and effective end date 119 for defining the effective period within which the encrypting keys 112-115 are valid.

In this exemplary embodiment, the encrypting role information 110 includes the first to fourth encrypting keys 112-115. The creator of the encrypted document knows in advance which viewer can use which encrypting keys 112-115 in the encrypting role information 110.

Figure 3:
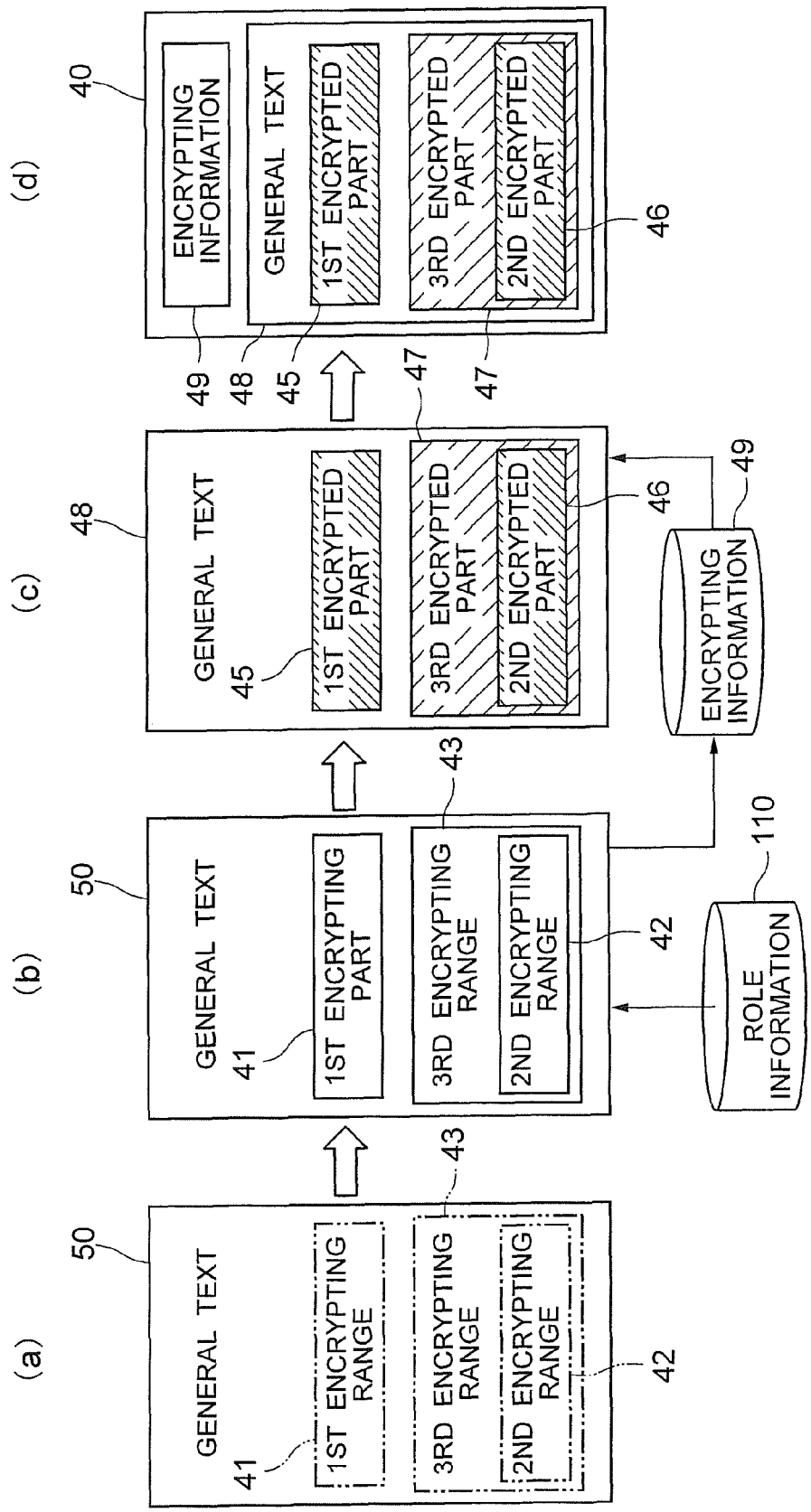
FIG. 3(a)-3(d) is an illustration showing a process for creating an encrypted document by encrypting a plain document by using an encrypting device of the encrypted communication system according to the exemplary embodiment of the invention.

As shown in FIG. 3A(a)-FIG. 3(c), the encryption processing device 12 selects the encrypting keys 112-115 by every designated encrypting ranges 41-43, performs the encryption processing collectively based upon the selected result, and creates encrypted parts 45-47. Further, the encryption processing device 12 performs the encryption processing in accordance with encrypting information 49 that will be described later. Furthermore, when there are two or more encrypting ranges 41-43 to be encrypted, the encryption processing device 12 performs the encryption processing in the following manner. That is, if the front end position and the rear end position of a given encrypting range (42) among the encrypting ranges 41-43 are positioned between the front end position and the rear end position of another encrypting range (43), the encryption processing device 12 performs the encryption processing on the encrypting range (42) earlier than the encrypting range (43).

As shown in FIG. 4, the encrypting information creating device 13 creates the encrypting information 49 that is configured with a single, two, or more records 491-493 containing: front end positions 494 and rear end positions of the encrypted parts 45-47 created by the encryption processing; key IDs 496 that correspond to the encrypting keys 112-115 applied to the encrypted parts; and orders 497 of the processing executed by the encryption processing device (see FIG. 3(d)). Further, when creating the encrypting information 49, the encrypting information creating device 13 includes front end positions 498 and rear end positions 499 of the encrypting ranges 41-43 that are designated by the creator who operates the encrypting device 10.

Furthermore, as shown n FIG. 3(b), designation of the encrypting ranges 41-43 by the creator is done by using a display device 18 that is provided to the encrypting device 10, e.g. a CRT, or a liquid crystal display.

A plain document 50 can be displayed on the display device 18, and the creator designates the encrypting range 41-43 from the displayed plain document 50 with an input by using a mouse and a keyboard, for example. Further, the encrypting ranges 41-43 may be displayed in different colors from that of the ranges other than the encrypting ranges on the display device 18 of the encrypting device 10, for example, so that the creator can identify the encrypting ranges.

The encrypting information creating device 13 creates each of the records 491-493 by determining the processing order 497 according to the order of designating the encrypting ranges 41-43. Further, the front end positions and the rear end positions of the records created by the encrypting information creating device 13 are set as follows, for example, when the plain document 50 is formed with plaintexts and the like.

In a case of a line unit mode: the front end position=the seventh line (from the top of the plain document 50), the rear end position=the eleventh line (from the top of the plain document 50)

In a case of a letter unit: the front end position=the eighth letter (from the top of the plain document 50), the rear end position=the fortieth letter (from the top of the plain document 50)

In this exemplary embodiment, it is assumed that the processing is set to be performed in the encrypting device 10 and the decrypting device 20 under a mode which designates encrypting part by a line unit in the plain text.

Further, the encrypting information creating device 13 has version number 490 included in the encrypting information 49. The version number 490 is provided for judging at what version the encrypted part is encrypted, because it may happen that the data structure to be managed is changed as the encrypting device 10 becomes improved. The version number 490 is the so-called version information used in software.

The encrypted document creating device 14 combines the encrypting information 49 from the encrypting information creating device and the encrypted document main body 48 that is encryption-processed by the encryption processing device 12 to create an encrypted document 40. This encrypted document 40 can be turned into individually customized file structures by adding extensions ".XXX" at the end of the files, for example.

The media (31, 35) to which the encrypted document 40 is written by the encrypted document storing device 15 may be of any types as long as it is the type from which the decrypting device 20 can read the document. For example, the encrypted document storing device 15 is configured with: software (mailer) which transmits an E-mail containing an encrypted document to have it saved in a storage device of a server device 31 (mail server) via a network 30 such as the Internet; software which uploads the encrypted document on the storage device of the server device 31; write-in software for storing the document to the medium 35 such as a flexible disk or a compact disk; and the like. Further, the encrypted document 40 may be directly stored in a storage device such as a hard disk drive provided to the decrypting device 20.

The encrypting device 10 is provided with an authentication device 16 which authenticates whether or not the user is the creator who is permitted to use the encrypting roll information 110, when the user wishes to use the encrypting role information 110 stored in the encrypting role information storage device 11. Further, the authentication device 16 has a function of encrypting the encrypting role information 110. When the creator uses the encrypting role information 110, the authentication device 16 requests an input of a password that is set by the creator oneself. When the password is correct, the authentication device 16 allows the creator to use the encrypted encrypting role information 110 by decrypting it.

The decrypting device 20 includes: a decrypting role information storage device 21 for storing decrypting role information that is configured with encrypting keys that correspond to the viewers and key IDs that correspond to the encrypting keys; an encrypted document extracting device 22 for extracting the encrypted document stored in the medium; a separating device 23 which separates and extracts the encrypting information 49 and the encrypted document main body from the encrypted document; an encrypting key loading device 24 for loading, from the decrypting role information storage device 21, the encrypting keys that correspond to the key IDs of records of the encrypting information 49 that is extracted by the separating device 23; and a decryption processing device 25 which decrypts the ranges from the front end positions to the rear end positions of the records in the encrypted document main body that is separated by the separating device, by using the encrypting keys that correspond to the respective ranges, in an order that is inverted from the processing order of the records of the encrypting information 49.

As shown in FIG. 2, the decrypting role information 210 stored in the decrypting role information storage device 21 is distributed to the viewers, respectively, like the encrypting role information 110. Further, the decrypting role information 210 is configured with a role information table that includes an individual ID 211 of the viewer, key IDs 212a-215a, encrypting keys 212-215, and effective start date 218 and an effective end date 219 of the encrypting keys. The decrypting device 20 is provided with an authentication device 27 which authenticates whether or not the user is the viewer who is permitted to use the decrypting roll information 210, when the user wishes to use the decrypting role information 210 stored in the decrypting role information storage device 21.

Further, the authentication device 27 encrypts the decrypting role information 210. Further, when the creator uses the decrypting role information 210, the authentication device 27 requests an input of a password that is set by the creator oneself. When the password is correct, the authentication device 27 allows the creator to use the encrypted encrypting role information 210 by decrypting it.

The encrypted document extracting device 22 includes: a mailer that receives mails from the mail server 31; a downloader for downloading the mail from the server device; software for reading out the contents from the medium 35 by using hardware such as an FD drive or a CD drive; and the like. The separating device 23 extracts the encrypted document main body and the encrypting information 49 from the encrypted document that is extracted by the encrypted document extracting device 22.

The decryption processing device 25 decrypts the ranges between the front end positions 494 and the rear end positions 495 of the records 491-493 by using the encrypting keys loaded by the encrypting key loading device 24, in an order that is inverted from the processing order of each of the records 491-493 of the encrypting information 49. Further, the decryption processing device 25 corrects the encrypting information 49 when the encrypting key the encrypting key loading device 24 wants to read out is not in the decrypting role information 210. Further, the decrypting device 20 is provided with a deleting device 26 which, when the encrypting keys 212-215 the encrypting key loading device 24 wants to read out are not in the decrypting role information 210, deletes, from the encrypted document main body 48, the part between the front end positions 495 and the rear end positions 496 of the records 491-493 that correspond to the encrypting keys 212-215 that are to be loaded.

Further, the encrypting keys 112-115 and 212-215 contained in the encrypting role information 110 and the decrypting role information 210 are common keys. That is, the encrypting keys 112-115 and 212-215 of the same key IDs 112a-115a and 212a-215a contained in the encrypting role information 110 and the decrypting role information 210 are the data identical to each other. Further, the decrypting device 20 is provided with a display device 29 such as a display on which the decrypted plain document 50 is displayed.

Furthermore, the encrypting device 10 and the decrypting device 20 are provided with a role information obtaining device (not shown) for obtaining the role information 110 and 210. The role information obtaining device obtains the role information from a role information managing server (not shown) that is connected to the encrypting device 10 and the decrypting device 20 via the network. The role information obtaining device obtains the role information from the role information managing server at prescribed intervals, for example, and updates the role information to be the latest so that the encrypting keys can remain valid (within the effective period).

Figure 6:
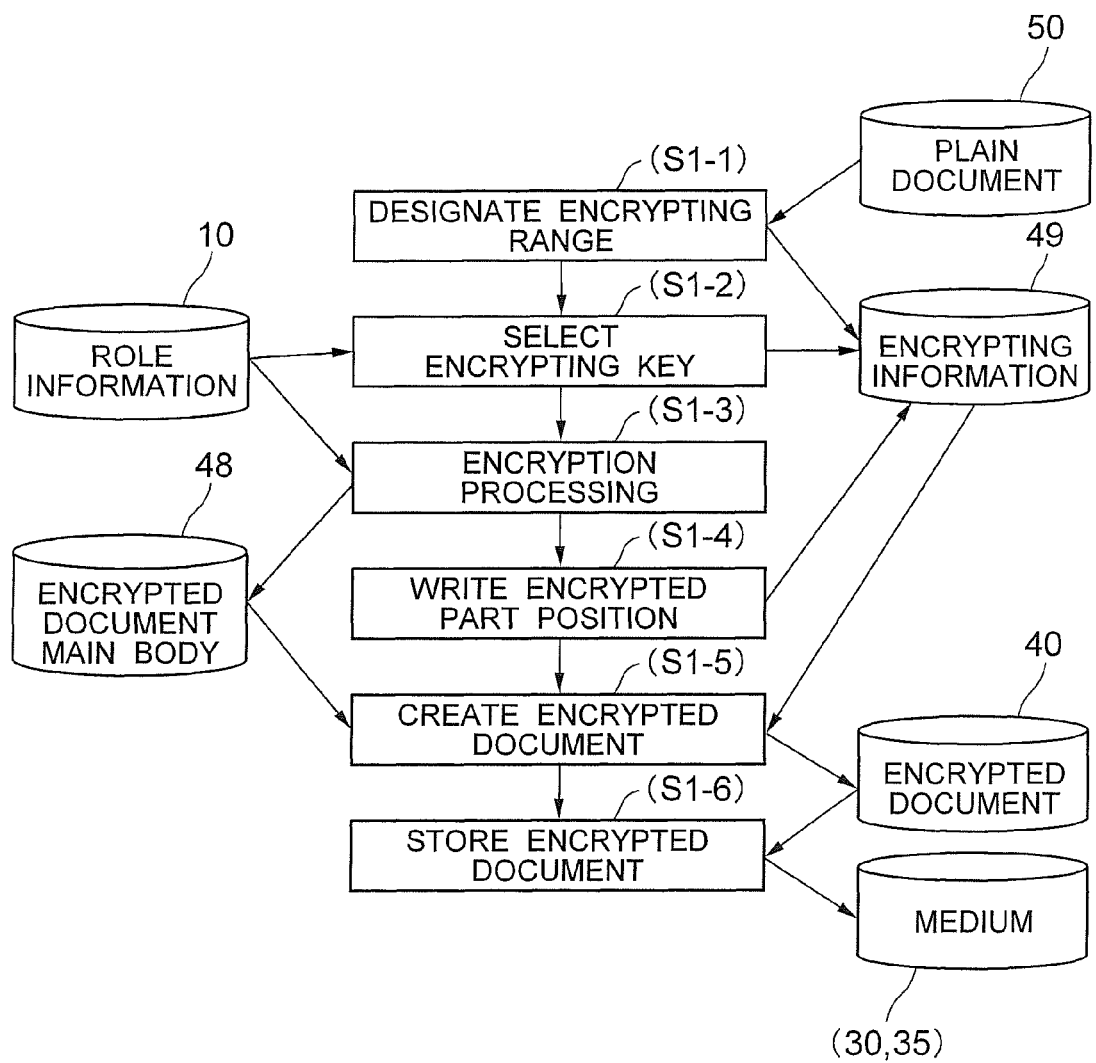
FIG. 6 is a flowchart showing operations of the encrypting device of the encrypted communication system according to the exemplary embodiment of the invention.
Figure 11:
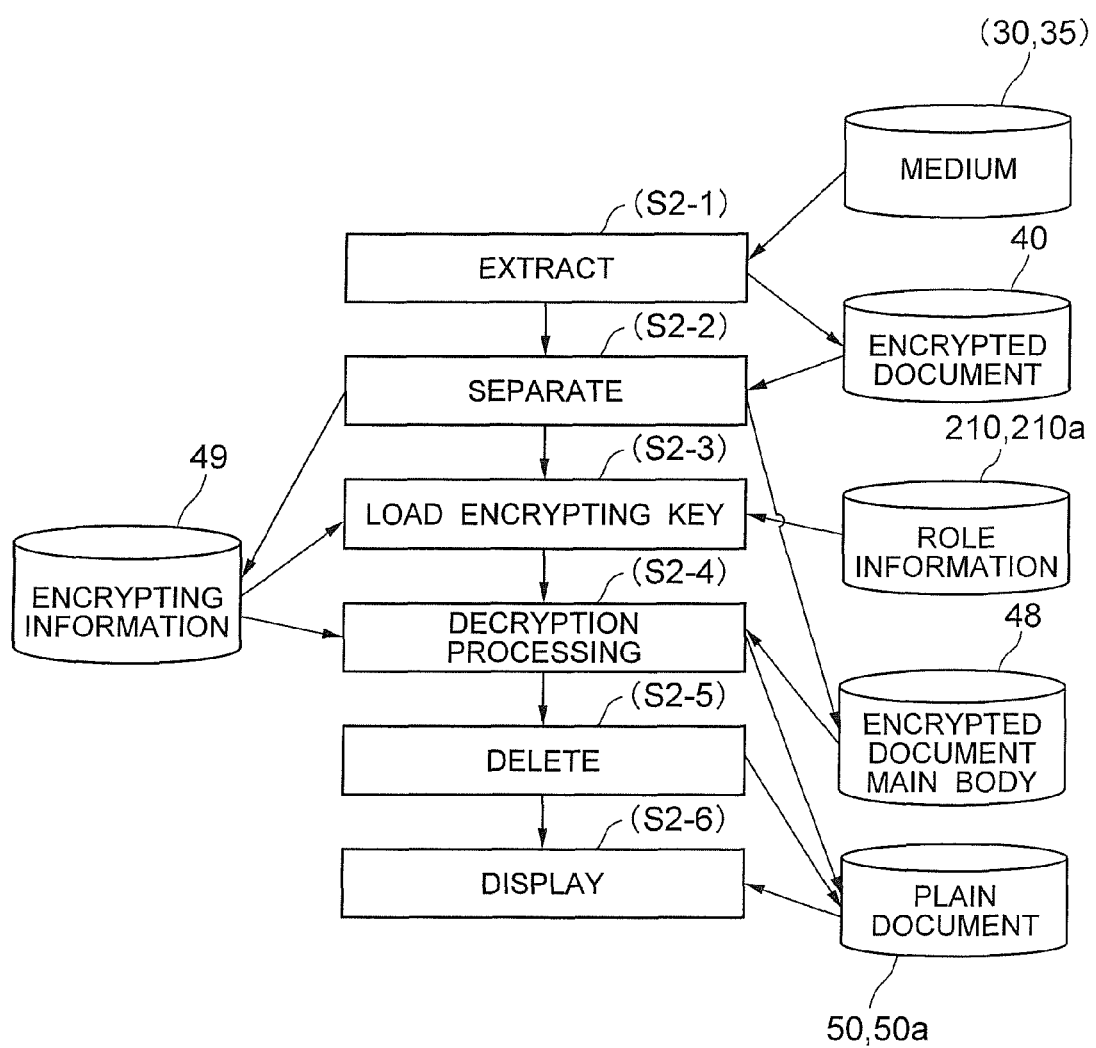
FIG. 11 is a flowchart showing operations of the decrypting device of the encrypted communication system according to the exemplary embodiment of the invention.
Figure 18:
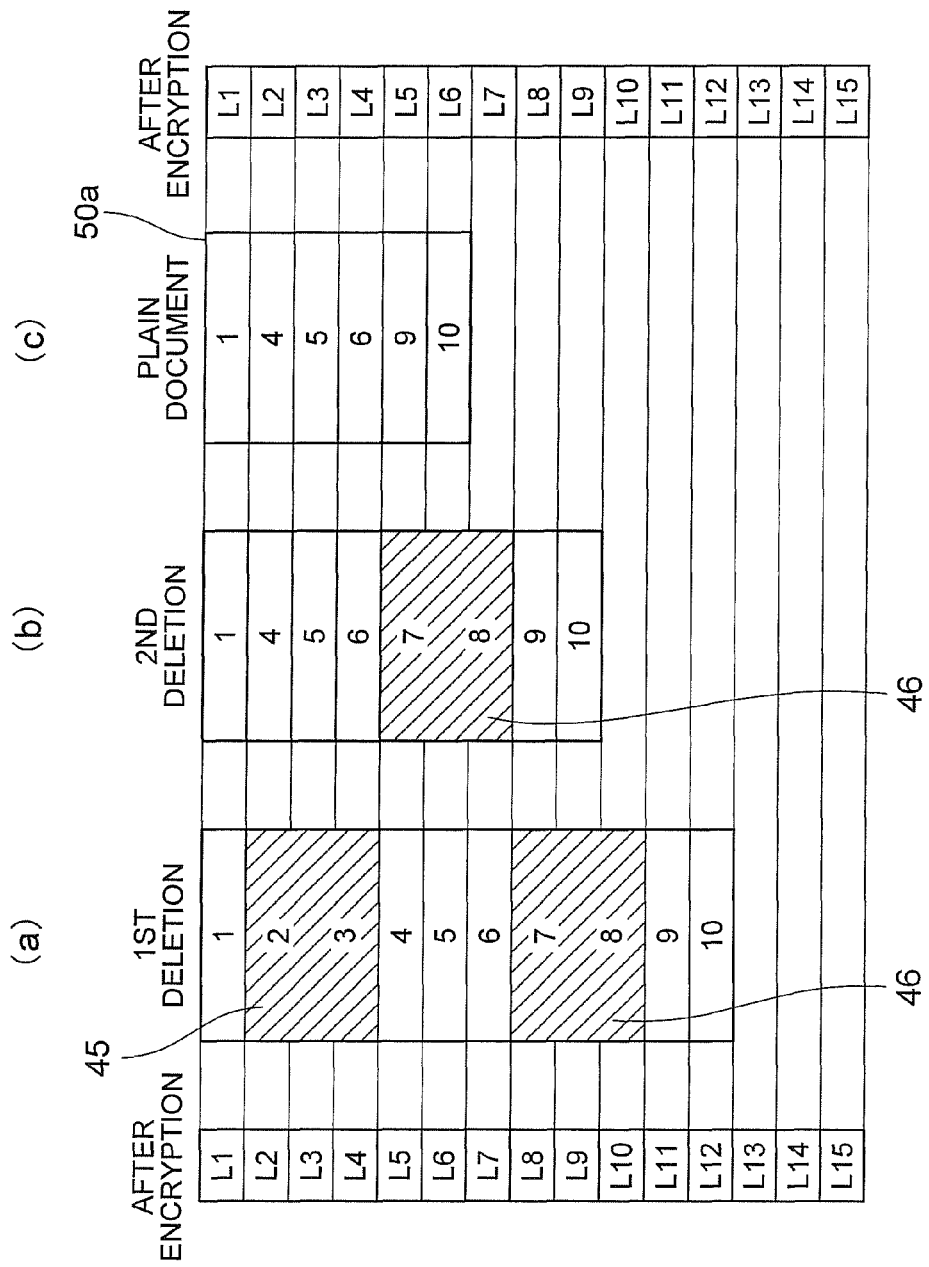
FIG. 18(a)-18(c) is an illustration showing a process for deleting the encrypted part performed by a deleting device of the decrypting device of the encrypted communication system according to the exemplary embodiment of the invention.

Next, operations of the encrypted communication system according to the exemplary embodiment configured in the above-described manner will be explained by referring to FIG. 6-FIGS. 13A-13C. FIG. 6 shows a flowchart of the encrypting device 10 and FIG. 11 shows a flowchart of the decrypting device 20.

Figures 7A, 7B, 7C, 7D:
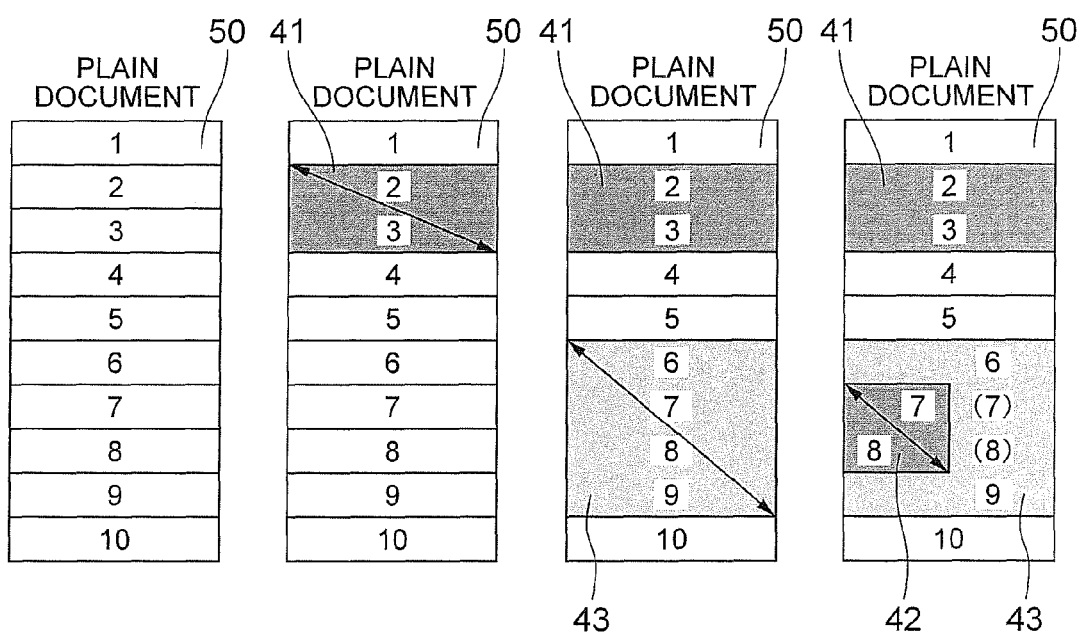
FIGS. 7A-7D are illustrations showing a process for designating a plurality of encrypting ranges by the encrypting device of the encrypted communication system according to the exemplary embodiment of the invention.

In this exemplary embodiment, the plain text 50 used in the encrypted communication system is a text file of ten lines under a file name of "file1.txt", as shown in FIG. 3(a) and FIG. 7A, for example. In this plain document 50, three parts, i.e. first encrypting range 41 that is the second line—the third line of the plain document 50 (see FIG. 7B), second encrypting range 42 that is the seventh line-eighth line (see FIG. 7C), and third encrypting range 43 that is the sixth line-ninth line (see FIG. 7D), are encryption-processed.

The first encrypting key is used for the first encrypting range 41 and the second encrypting range 42, and the second encrypting key is used for the third encrypting range 43, respectively, to perform the encryption processing. Further, a general text that is the part other than the first to third encrypting ranges indicates a range that is not encrypted, indicating the contents that can be read by anyone.

The encrypting role information 110 is obtained in advance from the role information managing server by the role information obtaining device of the encrypting device 10 and the decrypting device 20, and the encrypting role information 110 is stored in the encrypting role information storage device 11.

Then, the creator who operates the encrypting device 10 captures the created plain document 50 into the encrypting device 10, and designates the first-third encrypting ranges 41-43 in the plain document 50 that is displayed on the display device 18 (FIG. 3(b), step S1-1 of FIG. 6).

Further, the creator selects the encrypting keys 112-115 for encrypting the encrypting ranges 41-43 from the encrypting role information 110 every time the encrypting ranges 41-43 are designated (step S1-2 of FIG. 6). At that time, if the authentication device 16 makes a judgment that the creator is not allowed to use the encrypting role information 110, the following processing is not performed.

As shown in FIG. 5(b), FIGS. 7B-7D, and FIGS. 8A-8D, when each of the encrypting ranges 41-43 is designated and the respective encrypting key is selected from the keys 112-115, the encrypting information creating device 13 creates the encrypting information 49.

First, when the first encrypting range 41 is designated and the first encrypting key 112 for encrypting the encrypting range 41 is selected, a record with the processing order "1" is created (FIG. 7B, FIG. 8A).

Then, when the third encrypting range 43 is designated and the second encrypting key for encrypting the encrypting range 43 is selected, a record with the processing order "2" is created (FIG. 7C, FIG. 8B).

Thereafter, when the second encrypting range 42 is designated and the first encrypting key for encrypting the encrypting range 42 is selected, a record with the processing order "3" is created (FIG. 7D, FIG. 8C).

Subsequently, for example, when an execution button (not shown) of the encryption processing displayed on the display screen of the display device 18 is clicked by a pointer of a mouse or the like, the encryption processing is executed by the encryption processing device 12. The encryption processing device 12 first checks the values of the encrypting ranges 41-43 in the encrypting information (FIG. 8C) that is created by the encrypting information creating device 13.

At this time, the processing order of the second encrypting range 42 (processing order=3) contained in the third encrypting range 43 comes after the processing order of the third encrypting range 43 (processing order=2).

Therefore, the processing order correcting function of the encryption processing device 12 corrects the processing order of the second encrypting range 42 to be earlier than that of the third encrypting range 43 (FIG. 10A).

Then, the encryption processing device 12 executes the encryption processing in the following manner according to the processing order in the encrypting information 49 as shown in FIG. 9(a)-9(d) and FIGS. 10A-10D.

First, the first encrypting range 41 on the second-third lines of the plain document 50 (FIG. 9(a)) is specified by referring to the record with the processing order "1" (FIG. 10A). Then, the first encrypting key 112 whose key ID is 1 is read from the encrypting role information 110, and the encrypting range 41 is encrypted by using the key 112 to create a first encrypted part 45 (step S1-3 of FIG. 6, FIG. 9(b)).

With this, the data amount of the first encrypted part 45 becomes larger than that of the first encrypting range 41 because of padding, and the lines therein is increased from two lines to three lines.

The "padding" means to insert dummy data for aligning the sizes of the last block and the other blocks when a plaintext is divided according to the block size (64 bits or 128 bits) and encrypted. Like this, when there is padding, the volume of the encrypted text is increased compared to that of the plaintext.

Therefore, the encrypting information creating device 13 corrects the front end position and the rear end position of the encrypted part 45 of the record with the processing order "1" from L2-L3 to L2-L4. Further, the encrypting information creating device 13 corrects the front end position and the rear end position of the encrypted part 46 of the record with the processing order "2" from L7-L8 to L8-L9, and the front end position and the rear end position of the encrypted part 47 of the record with the processing order "3" from L6-L9 to L7-L10 (step S1-4, FIG. 10B).

Then, the second encrypting range 42 on L7-L8 lines is specified by referring to the front end position and the rear end position of the encrypted part of the record with the processing order "2" (FIG. 10B). Then, the first encrypting key 112 whose key ID is 1 is read from the encrypting role information 110, and the encrypting range 42 is encrypted by using the key 112 to create the second encrypted part 46 (step S1-3 of FIG. 6, FIG. 9(c)).

With this, the data amount of the second encrypted part 46 becomes larger than that of the second encrypting range 42 because of padding, and the lines therein is increased from two lines to three lines.

Therefore, the encrypting information creating device 13 corrects the front end position and the rear end position of the encrypted part of the record with the processing order "2" from L8-L9 to L8-L10. Further, the encrypting information creating device 13 corrects the front end position and the rear end position of the encrypted part of the record with the processing order "3" from L7-L10 to L7-L11 (step S1-4, FIG. 10C).

Then, the third encrypting range 43 on L7-L11 lines is specified by referring to the front end position and the rear end position of the encrypted part of the record with the processing order "3" (FIG. 10C). Then, the second encrypting key 113 whose key ID is 2 is read from the encrypting role information 110, and the encrypting range 43 is encrypted by using the key 113 to create the third encrypted part 47 (step S1-3 of FIG. 6, FIG. 9(d)).

With this, the data amount of the third encrypted part 47 becomes larger than that of the third encrypting range 43 because of padding, and the lines therein is increased from five lines to seven lines.

Therefore, the encrypting information creating device 13 corrects the front end position and the rear end position of the encrypted part 47 of the record with the processing order "3" from L7-L11 to L7-L13 (step S1-4 of FIG. 6, FIG. 10D).

Thereafter, the encrypted document creating device 14 combines the encrypted document main body 48 and the encrypting information 49 to create the encrypted document 40, and sets the file name of the encrypted document 40 as "file1.txt.XXX" (FIG. 3(d), step S1-5 of FIG. 6).

Then, the encrypted document storing device 14 stores the encrypted document 40 in the medium 35 or the storage part of the server device 31 (step S1-5 of FIG. 6).

Thereafter, as shown in FIG. 11, the decrypting device 20 performs the decryption processing in the following manner when extracting the plain document 50 from the encrypted document 40.

Figure 5:
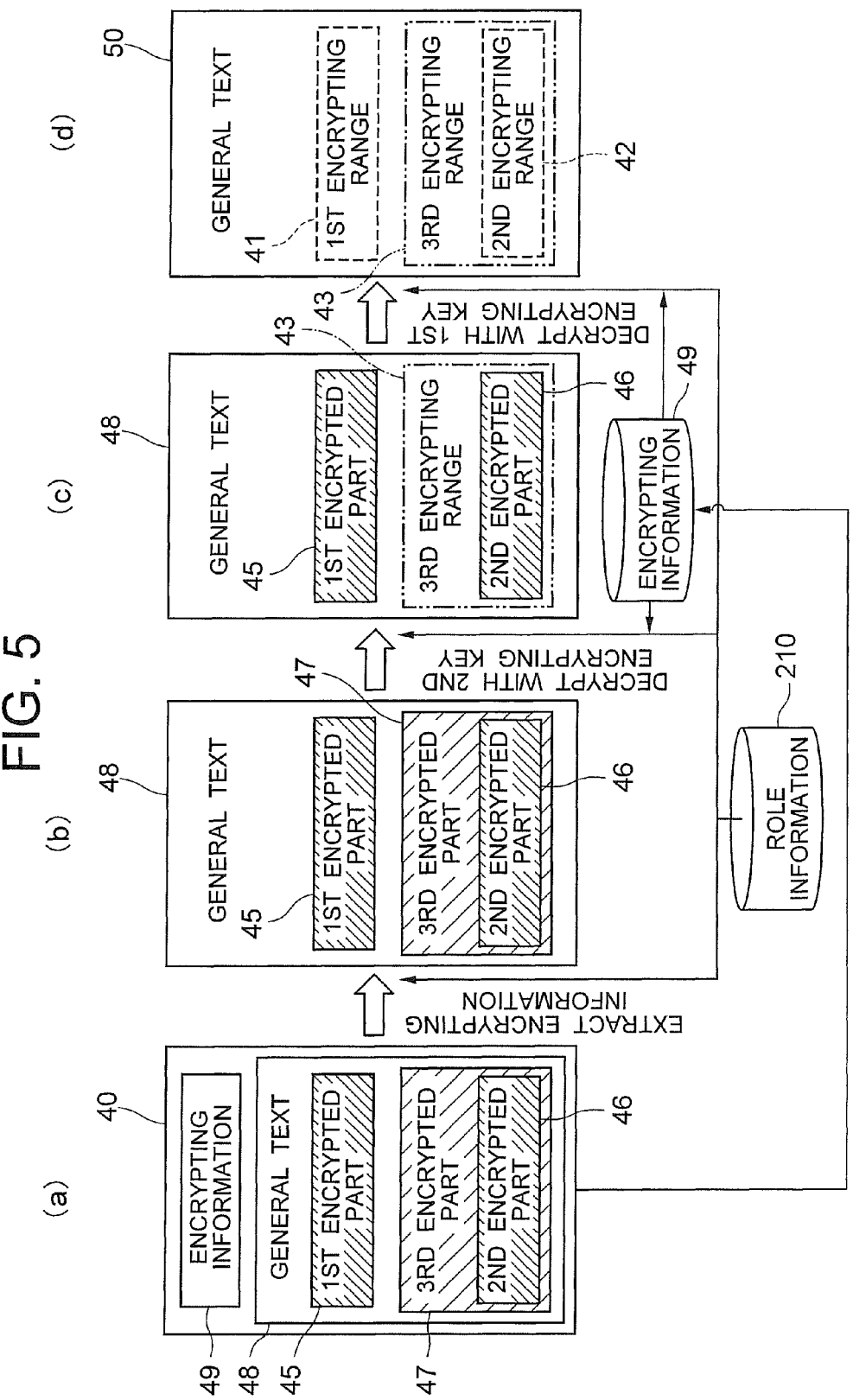
FIG. 5(a)-5(d) is an illustration showing a process for decrypting an encrypted document and extracting a plain document by using a decrypting device of the encrypted communication system according to the exemplary embodiment of the invention.

First, the encrypted document extracting device extracts the encrypted document ("file1.txt.XXX") from the medium 35 or the storage part of the server device 31 (step S2-1 of FIG. 11, FIG. 5(a)), and the separating device separates the encrypted document main body 48 ("file1.txt") and the encrypting information 49 from the encrypted document 40 (step S2-2 pf FIG. 11, FIG. 5(b), FIG. 9(d)).

Then, the encrypting key loading device 24 loads the first encrypting key 212 and the second encrypting key 213 from the decrypting role information 210 by referring to the key IDs of the encrypting information 49 (FIG. 13A) (step S2-3 of FIG. 11).

At that time, the authentication device 27 authenticates the viewer. When the authentication device 27 judges that the viewer is improper, the processing by the decryption processing device 25 is not performed.

Then, the decryption processing device 25 performs the decryption processing on the encrypted parts 45-47 of the encrypted document main body 48 in the order inverted from the processing order 497 of the encrypting information 49 (step S2-4 of FIG. 11).

First, as shown in FIG. 12(a) and FIG. 13A, the third encrypted part 47 (L7-L13) in the encrypted document main body 48 is specified from the front end position and the rear end position of the record with the processing order "3". The third encrypted part 47 is decrypted by selecting the second encrypting key 213 from the key ID 496 of the record (FIG. 12(b)).

Thereafter, as shown in FIG. 12(b) and FIG. 13B, the second encrypted part 46 (L8-L10) in the encrypted document main body 48 is specified from the front end position and the rear end position of the record with the processing order "2". The second encrypted part 46 is decrypted by selecting the first encrypting key from the key ID of the record with the processing order "2" (FIG. 12(c)).

Then, as shown in FIG. 12(c) and FIG. 13C, the first encrypted part 45 (L2-L4) in the encrypted document main body 48 is specified from the front end position and the rear end position of the record with the processing order "1". The first encrypted part 45 is decrypted by selecting the first encrypting key 212 from the key ID of the record (FIG. 12(d)).

In this case, the viewer can use the first and second encrypting keys 212 and 213 as the decrypting role information 210, so that it is possible to decrypt all the encrypted parts 45-47.

Then, the decrypting device 20 displays the plain document 50 on the display device 29 (step S2-6 of FIG. 11).

Now, by referring to FIG. 11 and FIG. 14-FIGS. 19A, 19B, there will be described a case where the viewer of the encrypted document 40 using the decrypting device 20 is a viewer who can use decrypting role information 210a that contains only the second encrypting key 213.

Unlike the above case, the encrypted document 40 is created by performing the encryption processing in order of the second encrypting range, the third encrypting range, and the first encrypting range, for example.

In the decrypting device 20, the encrypted document extracting device 22 extracts the encrypted document 40 from the medium 35 or the storage part of the server device 31, and the separating device 23 separates the encrypted document main body 48 and the encrypting information 49 from the encrypted document 40 (step S2-1, S2-2 of FIG. 11, FIGS. 15(a) and 15(b)).

Then, the encrypting key loading device 24 refers to the encrypting information 49 and loads the second encrypting key 213 contained in the encrypting information 49 from the decrypting role information 210a (step S2-3 of FIG. 11).

Subsequently, the decryption processing device 25 performs the decryption processing on the encrypted parts 45-47 of the encrypted document main body 48 in the order inverted from the processing order of the encrypting information 49 (step S2-4 of FIG. 11).

First, as shown in FIG. 16(a) and FIG. 17A, the first encrypted part 45 (L2-L4) in the encrypted document main body is specified from the front end position and the rear end position of the record with the processing order "3". However, the first encrypting key 212 is not contained in the decrypting role information 210a, so that the decryption processing is not performed (FIG. 16(b)).

At this time, when the front end position and the rear en position of the encrypting range 41 is compared with the front end position and the rear end position of the encrypted part 45, there is an increase of one line in the encrypted part 45.

Thus, the decryption processing device 25 corrects the front end positions and the rear end positions of the encrypted parts 46-47 of the records with the processing order of "3" and earlier (smaller order number). Specifically, the decryption processing device 25 corrects the front end position and the rear end position of the encrypted part 47 with the processing order "2" from L6-l12 to L7-L13, and corrects the front end position and the rear end position of the encrypted part 46 with the processing order "1" from L7-L9 to L8-L10.

Then, as shown in FIG. 16(b) and FIG. 17B, the third encrypted part 47 (L7-L13) in the encrypted document main body 48 is specified from the front end position and the rear end position of the record with the processing order "2", and it is decryption-processed with the second encrypting key 213 (FIG. 16(b)).

Further, as shown in FIG. 16(b) and FIG. 17B, for the records with the processing order "1" and the record with the processing order "3", the first encrypting key 212 is not contained in the decrypting role information 210. Thus, the decryption processing thereon is not executed (FIG. 15(c)).

Then, the deleting device 26 functions since there are records remained in the encrypting information 49 (step S2-5 of FIG. 11).

The deleting device 26 specifies the first encrypted part 45 (L2-L4) from the front end position and the rear end position of the record with the processing order "2", and deletes it (FIG. 18(b)). At this time, three lines are deleted. Therefore, the front end position and the rear end position of the encrypted part 46 of the record with the processing order "1" are corrected from L8-L10 to L5-L7.

Then, the deleting device 26 specifies the second encrypted part 46 (L5-L7) from the front end position and the rear end position of the record with the processing order "1", and deletes it to create a plain document 50a (FIG. 15(d), FIG. 18(c)).

It is also possible for the deleting device 26 to delete the encrypted parts in order from the part having larger numerical values of the front end position and the rear end position after the encryption, irrespective of the processing order. In the case of the exemplary embodiment, the front end position and the rear end position of the second encrypted part 46 (L8-L10) have larger numerical values than the front end position and the rear end position of the first encrypted part 45 (L2-L4), so that the second encrypted part 46 is deleted first. In this manner, it becomes unnecessary to correct the encrypting information.

Then, the decrypting device 20 displays the plain document 50a on the display device 29 (step S2-6 of FIG. 11).

With this, even if the same encrypted document 40 is supplied to a plurality of viewers of different levels of authorized powers, it is possible to restrict the viewable ranges depending on the viewers since each viewer decrypts the encrypted document 40 with the decrypting role information 210 or 210a that is provided to the viewer oneself.

Thereby, it becomes unnecessary to create documents exclusively for each viewer. Therefore, the document can be corrected easily, so that management of the document becomes simple.

Further, the front end positions 494 and the rear end positions 495 of the encrypted parts 45-47 are contained in the encrypting information 49, so that the decrypting device 20 specifies the encrypted parts 45-47 based on the positional information. With this, a specific part of the plain document 50 can be encrypted without inserting identifiers into the plain document 50, so that the encrypted document can be created easily.

Further, since the identifiers are not inserted into the plain document 50, there is no obstruction for the creator and the viewer when viewing the plain document 50. Therefore, the creator and the viewer can understand the contents of the plain document 50 easily.

Furthermore, when the front end position and the rear end position of another encrypting range are included between the front end position and the rear end position of a given range of the encrypting ranges 41-43, it is also possible to perform encryption.

This makes it possible to correspond to an organizational hierarchy with a single plain document 50 by designating the encrypting ranges 42 and 43 multiply depending on the level of the authorized power of the viewer.

For example, it is assumed here that the plain document 50 mentioned above is a document for a division configured with those who are in charge of the system and those who are in charge of business operations, and the plain document 50 contains a part for the system personnel and a part for the business operation personnel. In this case, for example, the first encrypting key 212 is set as useable for the viewers in charge of the business operations, and the second encrypting key 213 is set useable for the viewers in charge of the system. Further, the first encrypting key 212 and the second encrypting key 213 are set useable for those who are in the higher positions of the division.

With this, each viewer can read the part that corresponds to the respective levels of the authorized powers.

Further, for example, if the viewer is in charge of the system, that viewer can read the range that can be decrypted with the second encrypting key 213. However, the viewer in charge of the system cannot read the range for those who are in charge of the business operations, since the viewer in charge of the system cannot use the first encrypting key 212. In the meantime, the viewer in charge of the business operations can read only the part that can be decrypted by the first encrypting key 212. The part that is not encrypted (general text) may be read as the part in common to the entire division.

Further, the viewers in the higher positions of the division can decrypt both parts for the system personnel and the business operations personnel.

Furthermore, the encrypting keys 212-215 used for decryption are not distributed by being contained in the encrypted document 40 but are stored in the decrypting role information 210 that is stored in advance to the decrypting device 20. Therefore, a risk of losing or leaking the encrypting keys to the others at the time of distribution can be decreased greatly.

That is, the key ID 496 is contained in the encrypting information 49 but the encrypting key 42 itself is not contained therein. Thus, it is possible to prevent the encrypting key 42 from being unlawfully extracted by an analysis of the encrypting information 49. Therefore, it is possible to prevent the use of the key by a third party to view the document unlawfully.

Further, the encrypting role information 110 and the decrypting role information 210 are encrypted by the authentication devices 16 and 17 by using the password of the creator or the viewer. Therefore, even if the encrypting role information 110 and the decrypting role information 210 are stolen, for example, the encrypting keys cannot be extracted unless the individual passwords are analyzed. This makes it difficult to decrypt and read the encrypted document.

Furthermore, the part that cannot be decrypted (among the encrypted parts 45-47) is deleted by the deleting device 26, thereby making it difficult for the viewers to recognize that there is a part not allowed to read.

Further, the effective periods for the encrypted keys 112-115 and 212-215 are set in the encrypting role information 110 and the decrypting role information 210 by using the effective start dates 118, 218 and the effective end dates 119, 219. Thus, encryption and decryption can be executed only within the effective periods but not outside the effective periods.

Thereby, even if the encrypting keys 112-115 and 212-215 are leaked to the others or the encrypting keys are decrypted or analyzed, the encrypting keys 112-115 and 212-215 become invalid after the effective periods. This is preferable in terms of the security.

In the exemplary embodiment, the encrypting role information contains the effective start dates 118, 218 and the effective end dates 119, 219. It is more preferable to have not only the date but also the time, so that the effective periods can be set more precisely.

Further, for example, for encrypting the plain document 50 configured with a file that is created by Word, Power Point (including text control objects), or the like (products of Microsoft Corporation), the encrypting information may become as follows, for example.

In a case of page unit mode: front end position=p. 3, rear end position=p. 5

In a case of line unit mode: front end position=seventh line from the top of p. 3, rear end position=eleventh line from the top of p. 5

In a case of letter unit mode: front end position=twenty-third letter from the top of p. 3, rear end position=thirteenth letter from the top of p. 5; or front end position=fifth letter of text control 2, rear end position thirteenth letter of text control 2

The above is presented merely as a way of example, and is not to be taken as a limitation. Furthermore, it is preferable for the encrypting information 49 to contain the positional information mode for specifying under which modes the front end positions and the rear end positions of the encrypted parts 45-47 are written.

Further, in the exemplary embodiment, the encrypting information described above is created in advance and the designated encrypting ranges 41-43 are encryption-processed collectively. However, it is not limited only to that.

For example, the encryption processing device 12 of the encrypting device 10 is capable of dealing with a case where the encryption processing is performed by selecting a corresponding key from the encrypting keys 112-115 every time a single encrypting range among the encrypting ranges 41-43 is designated.

This is preferable since the order of encryption can be changed by visually checking which of the ranges is actually being encrypted through performing encryption by designating the encrypting ranges.

Further, in this case, when the creator that uses the encrypting device 10 tries to designate an encrypting range in such a manner that one of or both of the front end position and the rear end position of the encrypting range falls within an already encrypted part, the encrypting device 10 displays an error message on the display device and performs processing to give a warning to the creator that such designation of the encrypting range cannot be accepted.

Next, another exemplary embodiment of the present invention will be described. An encrypted communication system according to another exemplary embodiment of the present invention includes an encrypting device for creating an encrypted document from a plain document and a decrypting device for decrypting the encrypted document to obtain the plain document, wherein: the encrypting device may include:

an encrypting role information storage device for storing encrypting role information that is configured with a plurality of encrypting keys corresponding to the authorized powers of the viewers as well as key IDs for identifying the encrypting keys; an encryption processing device which grasps the encrypting range that is configured with a part of or an entire part of the plain document, and creates the encrypted part by encrypting the encrypting range by using the encrypting key in the encrypting role information; an encrypting information creating device for creating the encrypting information that is configured with one, two, or more record(s) including the front position and rear position of the encrypted part, the key ID corresponding to the encrypting key that is applied for the encrypted part, and the processing order of the encrypted part; an encrypted document creating device for creating the encrypted document by combining an encrypted document main body configured with a document containing the encrypted part with the encrypting information; and an encrypted document storing device for storing the encrypted document created by the encrypted document creating device to a prescribed medium.

In the encrypted communication system structured in this manner, the front end position and the rear end position of the encrypted part are contained in the encrypting information by the encrypting information creating device of the encrypting device. Thus, the encrypted part can be specified based on the front end position and the rear end position of the encrypted part.

With this, a specific part of the plain document can be encrypted without inserting identifiers into the plain document, so that the encrypted document can be created easily.

Further, in the encrypted communication system, the encryption processing device of the encrypting device encrypts each of the encrypting ranges by using the encrypting keys that correspond to the levels of authorized powers of the viewers. Thus, even if the same encrypted document is supplied to a plurality of viewers, it is possible to restrict the viewable ranges depending on the viewers since each viewer decrypts the encrypted document by using the encrypting key that is provided according to the level of the authorized power of the viewer oneself.

Thereby, it becomes unnecessary to create documents exclusively for each viewer. Therefore, the document can be corrected easily, so that management of the document becomes simple.

Furthermore, it is possible to have the front end position and the rear end position of one of the encrypting ranges positioned between the front end position and the rear end position of another one of the encrypting ranges and to designate the encrypting ranges multiply. This makes it possible to correspond to an organizational hierarchy.

Further, it is preferable for the encryption processing device to have a processing order correcting function which, when there are two encrypting ranges or more, and the front end position and the rear end position of a given encrypting range among the encrypting ranges are somewhere between the front end position and the rear end position of another one of the encrypting ranges, performs the encrypting processing on the given encrypting range earlier than the another encrypting range.

In the encrypted communication system structured in this manner, the encrypting device executes the encryption processing from the given encrypting range that is within another encrypting range by the use of the processing order correcting function. Therefore, the encryption processing device can execute the encryption processing on each of the encrypting ranges securely.

Further, it is preferable for the encrypting device to include an authentication device which authenticates whether or not a creator is allowed to use the encrypting role information, when the creator wishes to use the encrypting role information stored in the encrypting role information storage device.

With this, the encrypting key cannot be obtained unless the authentication device authenticates the creator. This makes it difficult to decrypt and read the encrypted document.

Further, it becomes possible to prevent the third parties to obtain the plain document unlawfully from the encrypted document.

It is preferable for the authentication device to have a function of encrypting the encrypting role information with a password or the like. This is preferable because the encrypting role information can be remained encrypted when it is used without the password set by the creator and, even if the encrypting role information is stolen unlawfully, the contents thereof cannot be read.

Furthermore, it is preferable for the decrypting device to include: a decrypting role information storage device for storing decrypting role information that is configured with an encrypting key corresponding to a viewer and a key ID corresponding to the encrypting key; an encrypted document extracting device for extracting the encrypted document that is stored in the medium; a separating device for separating and extracting encrypting information and an encrypted document main body from the encrypted document; an encrypting key loading device for loading, from the decrypting role information storage device, the encrypting key that corresponds to the key ID of a record of the encrypting information extracted by the separating device; and a decryption processing device for decrypting a range between the front end position and the rear end position of the record in the encrypted document main body that is extracted by the extracting device, by using the encrypting key that corresponds to the range in a processing order inverted from a processing order in the record of the encrypting information.

In the encrypted communication system structured in this manner, the decryption processing device decrypts from the front end position to the rear end position of the encrypted part by using an appropriate encrypting key. Thus, the plain document can be obtained securely from the encrypted document.

Further, when the decrypting role information contains no encrypting key that corresponds to the key ID contained in the encrypting information, the corresponding part cannot be decrypted.

This makes it possible to restrict the viewable ranges depending on the levels of the authorized powers of the viewers.

Further, the decryption processing is executed in the order inverted from the processing order of the encryption processing, so that the multiply encrypted parts can be decrypted securely.

Furthermore, it is preferable for the decrypting device to include a deleting device which deletes, when an encrypting key the encrypting key loading device wishes to read is not in the decrypting role information, a part between the front end position and the rear end position of the record that corresponds to the encrypting key from the encrypted document main body.

In this case, the deleting device deletes the encrypted part that cannot be decrypted. This makes it difficult for the viewer to recognize that there is a part that cannot be read by that viewer.

Moreover, it is preferable for the decrypting device to include an authentication device which authenticates whether or not the viewer is allowed to use the decrypting role information, when that viewer wishes to use the decrypting role information stored in the decrypting role information storage device.

With this, the encrypting key cannot be obtained unless the authentication device of the decrypting device authenticates the viewer. This makes it difficult to decrypt and read the encrypted document.

Further, it becomes possible to prevent the third parties to obtain the plain document unlawfully from the encrypted document.

It is preferable for the authentication device to have a function of encrypting the decrypting role information with a password or the like. This is preferable because the decrypting role information can be remained encrypted when it is used without the password set by the viewer and, even if the decrypting role information is stolen unlawfully, the contents thereof cannot be read.

Further, it is preferable for the encrypting keys to be common keys.

With this, the encryption processing and the decryption processing become simple, thereby making it possible to shorten the time for the encryption and decryption processing.

Further, an encrypted communication method according to another exemplary embodiment of the present invention is a method of an encrypted communication system which includes an encrypting device for creating an encrypted document from a plain document and a decrypting device for decrypting the encrypted document to obtain the plain document. The method may include, performed by the encrypting device: a step of creating an encrypted part by encrypting an encrypting range that is configured with a part of or an entire part of the plain document by using one of the encrypting keys stored in an encrypting role information storage device for storing encrypting role information that is configured with the encrypting keys corresponding to levels of authorized powers of viewers as well as key IDs for identifying the encrypting keys; a step of creating a record including an order of the encryption processing, an front end position and a rear end position of the encrypted part, and the key ID corresponding to the encrypting key that is applied to the encrypted part; a step of creating encrypting information by combining one, two, or more of the records; a step of creating the encrypted document by combining an encrypted document main body configured with a document containing the encrypted part with the encrypting information; and a step of storing the encrypted document created by the encrypted document creating device to a prescribed medium.

The encrypted communication method structured in this manner is not limited to be used for the encrypted communication system described above but may be applied to various kinds of structures.

Further, an encrypting device according to another exemplary embodiment of the present invention is a device for creating an encrypted document from a plain document, which may include: an encrypting role information storage device for storing encrypting role information that is configured with a plurality of encrypting keys corresponding to the levels of the authorized powers of the viewers as well as key IDs for identifying the encrypting keys; an encryption processing device which grasps the encrypting range that is configured with a part of or an entire part of the plain document, and creates the encrypted part by encrypting the encrypting range by using the encrypting key stored in the encrypting role information; an encrypting information creating device for creating the encrypting information that is configured with one, two, or more record(s) containing the front position and rear position of the encrypted part created by the encryption processing device, the processing order of the encrypted part, and the key ID corresponding to the encrypting key that is applied for the encrypted part; an encrypted document creating device for creating the encrypted document by combining an encrypted document main body configured with a document containing the encrypted part with the encrypting information; and an encrypted document storing device for storing the encrypted document created by the encrypted document creating device to a prescribed medium.

With the encrypting device structured in this manner, a specific part of the plain document can be encrypted without inserting identifiers into the plain document. Therefore, the encrypted document can be created easily.

Furthermore, a decrypting device according to another exemplary embodiment of the present invention is a device for decrypting an encrypted document to obtain a plain document, which may include: a decrypting role information storage device for storing decrypting role information that is configured with an encrypting key corresponding to a viewer and a key ID corresponding to the encrypting key; an encrypted document extracting device for extracting the encrypted document that is stored in the medium; a separating device for separating and extracting encrypting information and an encrypted document main body from the encrypted document; an encrypting key loading device for loading, from the decrypting role information storage device, the encrypting key that corresponds to the key ID of a record of the encrypting information extracted by the separating device; and a decryption processing device for decrypting a range between the front end position and the rear end position of the record in the encrypted document main body that is extracted by the extracting device, by using the encrypting key that corresponds to the range in a processing order inverted from a processing order of the record in the encrypting information.

With the decrypting device structured in this manner, the encrypted part of the encrypted document can be decrypted without inserting identifiers into the plain document.

While the devices of the present invention have been described above by referring to the preferred exemplary embodiments thereof, it is needless to say that the devices according to the present invention are not limited to those exemplary embodiments but various changes and modifications are possible within the scope of the appended claims of the present invention.

For example, the encryption processing device of the encrypting device in the above-described exemplary embodiments performs encryption with padding. However, there may be no padding in the encryption processing. In that case, the front end position and the rear end position of the designated encrypting range are consistent with the front end position and the rear end position of the encrypted part that has gone through the encryption processing. Therefore, it is not necessary to provide the information of the front end positions and the rear end positions of the encrypting ranges specifically.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An encrypted communication system, comprising an encrypting device for creating an encrypted document from a plain document and a decrypting device for decrypting the encrypted document to obtain the plain document, wherein
the encrypting device comprises:
an encrypting role information storage device for storing encrypting role information that is configured with a plurality of encrypting keys corresponding to levels of authorized powers of viewers as well as key IDs for identifying the encrypting keys;
an encrypting process device which grasps an encrypting range designated from the plain document, and encrypts the encrypting range with a key selected among the plurality of encrypting keys configuring the encrypting role information;
an encrypting information creating device for creating encrypting information that includes: a front position and a rear position in the plain document to which the encryption processing is executed, and the key ID corresponding to the encrypting key that is applied for the encrypting range; and
an encrypted document creating device for creating the encrypted document by combining the encrypting information with the document that has been encrypted, and
the decrypting device comprises:
a decrypting role information storage device for storing decrypting role information that is configured with an encrypting key corresponding to a viewer and a key ID corresponding to the encrypting key;
a separating device for separating and extracting the encrypting information and an encrypted document main body from the encrypted document;
an encrypting key loading device for loading, from the decrypting role information storage device, the encrypting key corresponding to the key ID of the encrypting information extracted by the separating device; and
a decrypting processing device for decrypting the range between the front end position and the rear end position in the encrypted document main body by using the encrypting key that corresponds to the range,
the encrypting and decrypting devices comprise:
wherein a role information obtaining device obtains the role information from a role information managing server at prescribed intervals, and updates the role information to be the latest so that the encrypting keys can remain valid within an effective period; and
wherein the effective periods for the encrypted keys are set in the encrypting role information and the decrypting role information by using the effective start dates and the effective end dates enabling encryption and decryption to be executed only within the effective periods but not outside the effective periods.

2. The encrypted communication system as claimed in claim 1, wherein the encrypting device deletes, when the encrypting key corresponding to the key ID of the encrypting information does not exist in the decrypting role information, the range between the front end position and the rear end position that is encrypted with the encrypting key corresponding to the key ID from the encrypted document main body.

3. The encrypted communication system as claimed in claim 2, wherein the encrypting information further includes an order of the encryption processing when there are two encrypting ranges or more, and the decryption processing device performs the decryption processing in a processing order that is inverted from the order of the encryption processing.

4. The encrypted communication system as claimed in claim 1, wherein the encryption processing device, when there are two encrypting ranges or more, and the front end position and the rear end position of a given encrypting range among the encrypting ranges are somewhere between the front end position and the rear end position of another one of the encrypting ranges, performs the encrypting processing on the given encrypting range earlier than the another encrypting range.

5. The encrypted communication system as claimed in claim 1, wherein the encrypting device comprises an authentication device which authenticates whether or not a creator is allowed to use the encrypting role information, when the creator wishes to use the encrypting role information stored in the encrypting role information storage device.

6. The encrypted communication system as claimed in claim 1, wherein the decrypting device performs decryption processing in a processing order that is inverted from an order of encryption processing performed by the encrypting device, when there are two encrypting ranges or more.

7. The encrypted communication system as claimed in claim 1, wherein the decrypting device comprises an authentication device which authenticates whether or not a viewer is allowed to use the decrypting role information, when the viewer wishes to use the decrypting role information stored in the decrypting role information storage device.

8. An encrypted communication system, comprising an encrypting means for creating an encrypted document from a plain document and a decrypting means for decrypting the encrypted document to obtain the plain document, wherein
the encrypting comprises:
an encrypting role information storage device for storing encrypting role information that is configured with a plurality of encrypting keys corresponding to levels of authorized powers of viewers as well as key IDs for identifying the encrypting keys;
an encrypting process device which grasps an encrypting range designated from the plain document, and encrypts the encrypting range with a key selected among the plurality of encrypting keys configuring the encrypting role information;
an encrypting information creating device for creating encrypting information that includes: a front position and a rear position in the plain document to which the encryption processing is executed, and the key ID corresponding to the encrypting key that is applied for the encrypting range; and
an encrypted document creating device for creating the encrypted document by combining the encrypting information with the document that has been encrypted, and
the decrypting comprises:
a decrypting role information storage device for storing decrypting role information that is configured with an encrypting key corresponding to a viewer and a key ID corresponding to the encrypting key;
a separating device for separating and extracting the encrypting information and an encrypted document main body from the encrypted document;
an encrypting key loading device for loading, from the decrypting role information storage device, the encrypting key corresponding to the key ID of the encrypting information extracted by the separating device; and
a decrypting processing device for decrypting the range between the front end position and the rear end position in the encrypted document main body by using the encrypting key that corresponds to the range, the encrypting and decrypting comprise:
wherein a role information obtaining device obtains the role information from a role information managing server at prescribed intervals, and updates the role information to be the latest so that the encrypting keys can remain valid within an effective period; and
wherein the effective periods for the encrypted keys are set in the encrypting role information and the decrypting role information by using the effective start dates and the effective end dates enabling encryption and decryption to be executed only within the effective periods but not outside the effective periods.

9. A decrypting device used for an encrypted communication system for creating an encrypted document from a plain document and extracting the plain document by decrypting the encrypted document, wherein
the encrypted document is created by an encrypting device that comprises:
an encrypting role information storage device for storing encrypting role information that is configured with a plurality of encrypting keys corresponding to levels of authorized powers of viewers as well as key IDs for identifying the encrypting keys;
an encrypting process device which grasps an encrypting range designated from the plain document, and encrypts the encrypting range with a key selected among the plurality of encrypting keys configuring the encrypting role information;
an encrypting information creating device for creating encrypting information that includes: a front position and a rear position in the plain document to which the encryption processing is executed, and the key ID corresponding to the encrypting key that is applied for the encrypting range; and
an encrypted document creating device for creating the encrypted document by combining the encrypting information with the document that has been encrypted, and
the decrypting device comprises:
a decrypting role information storage device for storing decrypting role information that is configured with an encrypting key corresponding to a viewer and a key ID corresponding to the encrypting key;
a separating device for separating and extracting the encrypting information and an encrypted document main body from the encrypted document;
an encrypting key loading device for loading, from the decrypting role information storage device, the encrypting key corresponding to the key ID of the encrypting information extracted by the separating device; and
a decrypting processing device for decrypting the range between the front end position and the rear end position in the encrypted document main body by using the encrypting key that corresponds to the range,
the encrypting and decrypting devices comprise:
wherein a role information obtaining device obtains the role information from a role information managing server at prescribed intervals, and updates the role information to be the latest so that the encrypting keys can remain valid within an effective period; and
wherein the effective periods for the encrypted keys are set in the encrypting role information and the decrypting role information b using the effective start dates and the effective end dates enabling encryption and decryption to be executed only within the effective periods but not outside the effective periods.

10. The decrypting device as claimed in claim 9, which performs decryption processing in a processing order that is inverted from an order of encryption processing performed by the encrypting device, when there are two encrypting ranges or more.

11. A decrypting means used for an encrypted communication system for creating an encrypted document from a plain document and extracting the plain document by decrypting the encrypted document, wherein
the encrypted document is created by an encrypting that comprises:
an encrypting role information storage device for storing encrypting role information that is configured with a plurality of encrypting keys corresponding to levels of authorized powers of viewers as well as key IDs for identifying the encrypting keys;
an encrypting process device which grasps an encrypting range designated from the plain document, and encrypts the encrypting range with a key selected among the plurality of encrypting keys configuring the encrypting role information;
an encrypting information creating device for creating encrypting information that includes: a front position and a rear position in the plain document to which the encryption processing is executed, and the key ID corresponding to the encrypting key that is applied for the encrypting range; and
an encrypted document creating device for creating the encrypted document by combining the encrypting information with the document that has been encrypted, and
the decrypting comprises:
a decrypting role information storage device for storing decrypting role information that is configured with an encrypting key corresponding to a viewer and a key ID corresponding to the encrypting key;
a separating device for separating and extracting the encrypting information and an encrypted document main body from the encrypted document;
an encrypting key loading device for loading, from the decrypting role information storage device, the encrypting key corresponding to the key ID of the encrypting information extracted by the separating device; and
a decrypting processing device for decrypting the range between the front end position and the rear end position in the encrypted document main body by using the encrypting key that corresponds to the range,
the encrypting and decrypting comprise:
wherein a role information obtaining device obtains the role information from a role information managing server at prescribed intervals, and updates the role information to be the latest so that the encrypting keys can remain valid within an effective period; and
wherein the effective periods for the encrypted keys are set in the encrypting role information and the decrypting role information by using the effective start dates and the effective end dates enabling encryption and decryption to be executed only within the effective periods but not outside the effective periods.

12. An encrypted communication method which creates an encrypted document from a plain document by an encrypting device and obtains the plain document by decrypting the encrypted document by a decrypting device, comprising:
at the encrypting device,
storing encrypting role information that is configured with a plurality of encrypting keys corresponding to levels of authorized powers of viewers as well as key IDs for identifying the encrypting keys, by an encrypting role information storage device of the encrypting device;

grasping an encrypting range designated from the plain document, and encrypting the encrypting range with a key selected among the plurality of encrypting keys configuring the encrypting role information, by an encrypting process device of the encrypting device;

creating encrypting information that includes: a front position and a rear position in the plain document to which the encryption processing is executed, and the key ID corresponding to the encrypting key that is applied for the encrypting range, by an encrypting information creating device of the encrypting device; and creating the encrypted document by combining the encrypting information with the document that has been encrypted, by an encrypted document creating device of the encrypting device, and at the decrypting device, storing decrypting role information that is configured with an encrypting key corresponding to a viewer and a key ID corresponding to the encrypting key, by a decrypting role information storage device of the decrypting device;

separating and extracting the encrypting information and an encrypted document main body from the encrypted document, by a separating device of the decrypting device;

loading, from the decrypting role information storage device, the encrypting key corresponding to the key ID of the encrypting information extracted by the separating device, by an encrypting key loading device of the decrypting device; and decrypting the range between the front end position and the rear end position in the encrypted document main body by using the encrypting key that corresponds to the range, by a decrypting processing device of the decrypting device, the encrypting and decrypting devices comprise:

wherein a role information obtaining device obtains the role information from a role information managing server at prescribed intervals, and updates the role information to be the latest so that the encrypting keys can remain valid within an effective period; and wherein the effective periods for the encrypted keys are set in the encrypting role information and the decrypting role information b using the effective start dates and the effective end dates enabling encryption and decryption to be executed only within the effective periods but not outside the effective periods.

* * * * *